(12) United States Patent
Duggal et al.

(10) Patent No.: US 10,839,417 B2
(45) Date of Patent: Nov. 17, 2020

(54) GAUGING CONSUMER INTEREST OF IN-PERSON VISITORS

(71) Applicant: Adobe Inc., San Jose, CA (US)

(72) Inventors: Ashish Duggal, Delhi (IN); Sachin Soni, New Delhi (IN); Russell R. Stringham, Orem, UT (US); Anmol Dhawan, Ghaziabad (IN)

(73) Assignee: Adobe Inc., San Jose, CA (US)

( * ) Notice: Subject to any disclaimer, the term of this patent is extended or adjusted under 35 U.S.C. 154(b) by 557 days.

(21) Appl. No.: 15/073,277

(22) Filed: Mar. 17, 2016

(65) Prior Publication Data

US 2017/0270560 A1  Sep. 21, 2017

(51) Int. Cl.
| | |
|---|---|
| *G06Q 30/00* | (2012.01) |
| *G06Q 30/02* | (2012.01) |
| *H04N 21/414* | (2011.01) |
| *H04N 21/41* | (2011.01) |
| *H04N 21/45* | (2011.01) |
| *H04N 21/81* | (2011.01) |
| *H04N 21/8547* | (2011.01) |

(Continued)

(52) U.S. Cl.
CPC ... *G06Q 30/0242* (2013.01); *H04N 21/25841* (2013.01); *H04N 21/4126* (2013.01); *H04N 21/41415* (2013.01); *H04N 21/441* (2013.01); *H04N 21/4524* (2013.01); *H04N 21/4532* (2013.01); *H04N 21/812* (2013.01); *H04N 21/8547* (2013.01)

(58) Field of Classification Search
None
See application file for complete search history.

(56) References Cited

U.S. PATENT DOCUMENTS

| | | | | |
|---|---|---|---|---|
| 5,121,126 A | * | 6/1992 | Clagett | H04M 3/533 342/419 |
| 8,966,369 B2 | * | 2/2015 | Worthen | G11B 27/034 715/719 |

(Continued)

OTHER PUBLICATIONS

Anaganostopoulos; Automated Productionof Personalized Video Content for Vissiotrs of Thematic Parks; VLDB Conference 2006; 2006.*

(Continued)

*Primary Examiner* — Radu Andrei
(74) *Attorney, Agent, or Firm* — SBMC

(57) ABSTRACT

Gauging consumer interest of in-person visitors is described. In one or more embodiments, a promotional apparatus having a display screen and a wireless beacon is deployed at a venue. The promotional apparatus presents a video having multiple video segments. During the presentation, the beacon and a mobile device of a venue visitor communicate wirelessly to determine a proximity of the visitor to the display screen. Multiple distances are determined at multiple times. A path of movement can be determined from the distances over time. If the visitor alters a direction of travel to veer toward the screen or stops walking close to the screen, a system infers that the video has engaged the visitor's attention. By linking particular video segments to times at which the mobile device is proximate to the display screen, the system can further infer consumer interest in specific product features being shown at those times.

20 Claims, 10 Drawing Sheets

(51) Int. Cl.
*H04N 21/441* (2011.01)
*H04N 21/258* (2011.01)

(56) References Cited

U.S. PATENT DOCUMENTS

| | | | | |
|---|---|---|---|---|
| 9,286,611 | B2* | 3/2016 | Subhanjan | G06Q 30/02 |
| 2002/0124271 | A1* | 9/2002 | Herrmann | G06Q 30/02 |
| | | | | 725/151 |
| 2003/0113094 | A1* | 6/2003 | Tewksbury | H04N 5/775 |
| | | | | 386/230 |
| 2006/0200378 | A1* | 9/2006 | Sorensen | G06Q 10/063 |
| | | | | 705/7.29 |
| 2008/0152300 | A1* | 6/2008 | Knee | H04N 21/812 |
| | | | | 386/250 |
| 2009/0177528 | A1* | 7/2009 | Wu | G06O 30/0245 |
| | | | | 705/14.44 |
| 2010/0092005 | A1* | 4/2010 | Dunn | H04R 1/403 |
| | | | | 381/77 |
| 2010/0186032 | A1* | 7/2010 | Pradeep | H04N 21/26233 |
| | | | | 725/38 |
| 2010/0313214 | A1* | 12/2010 | Moriya | G06K 9/00771 |
| | | | | 725/12 |
| 2012/0050769 | A1* | 3/2012 | Houjou | G06F 3/1236 |
| | | | | 358/1.9 |
| 2012/0072272 | A1* | 3/2012 | Kilar | H04N 21/23439 |
| | | | | 705/14.4 |
| 2013/0086607 | A1* | 4/2013 | Tom | H04N 21/25891 |
| | | | | 725/32 |
| 2013/0101272 | A1* | 4/2013 | Plotnick | H04N 7/17318 |
| | | | | 386/249 |
| 2013/0173362 | A1* | 7/2013 | Zhou | G06Q 30/02 |
| | | | | 705/14.4 |
| 2014/0006951 | A1* | 1/2014 | Hunter | H04N 21/431 |
| | | | | 715/719 |
| 2014/0149221 | A1* | 5/2014 | Rycyna, III | G06Q 30/0264 |
| | | | | 705/14.61 |
| 2014/0278742 | A1* | 9/2014 | MacMillan | G06Q 30/0201 |
| | | | | 705/7.29 |
| 2014/0310106 | A1* | 10/2014 | Worthen | H04N 21/64322 |
| | | | | 705/14.66 |
| 2014/0365273 | A1* | 12/2014 | Hurewitz | G06Q 30/0643 |
| | | | | 705/7.29 |
| 2015/0189401 | A1* | 7/2015 | Yi | H04N 21/2343 |
| | | | | 725/32 |
| 2015/0332335 | A1* | 11/2015 | Abraham | G06Q 30/02 |
| | | | | 705/14.44 |
| 2017/0018006 | A1* | 1/2017 | Walden | G06Q 30/0259 |
| 2017/0188116 | A1* | 6/2017 | Major | H04N 21/47217 |
| 2017/0249651 | A1* | 8/2017 | Pulitzer | H04L 67/18 |
| 2017/0264920 | A1* | 9/2017 | Mickelsen | H04N 21/44008 |
| 2018/0197196 | A1* | 7/2018 | Cho | G06Q 30/0224 |

OTHER PUBLICATIONS

Rubino; MusA—Using Indoor Positioning and Navigation to Enhance Cultural Experience s in a Museum; Sensors 2013; 28 pages; 2013.*
"Automatically identify personas that matter", Retrieved at: https://amplitude.com/enhance-user-engagement—on Sep. 9, 2019, 9 pages.
"Goal Tracking with Matomo", Retrieved at: https://matomo.org/goals/—on Sep. 9, 2019, 4 pages.
"Segment Builder—Adobe", Retrieved at: https://docs.adobe.com/content/help/en/analytics/components/segmentation/segmentation-workflow/seg-build.html#concept_BD4C17B01C5B4E378D0C14C852D055D4—on Sep. 6, 2019, 14 pages.
"Segment IQ Overview—Adobe", Retrieved at: https://docs.adobe.com/content/help/en/analytics/analyze/analysis-workspace/panels/segment-comparison/segment-comparison.html—on Sep. 6, 2019, 7 pages.
Chen,"Mining changes in customer behavior in retail marketing", May 2005, pp. 773-781.
Feige,"Maximizing non-monotone submodular functions", Jan. 29, 2011, 19 pages.
Fokkema,"Fitting Prediction Rule Ensembles with R Package pre", Oct. 30, 2018, 30 pages.
Haider,"Discriminative Clustering for Market Segmentation", Aug. 2012, 10 pages.
Holte,"Very Simple Classification Rules Perform Well on Most Commonly Used Datasets", Apr. 1, 1993, 32 pages.
Huang,"Marketing segmentation using support vector clustering", Feb. 2007, pp. 313-317.
Jin,"Data Discretization Unification", Knowledge and Information Systems 19.1, Apr. 1, 2009, 14 pages.
Macha,"Explaining Anomalies in Groups with Characterizing Subspace Rules", May 2, 2018, 31 pages.
Tabb,"Introducing Automatic Segmentation", Retrieved at: https://mixpanel.com/blog/2017/11/14/introducing-automatic-segmentation/, Nov. 14, 2017, 9 pages.
Witten,"A framework for feature selection in clustering", Jun. 1, 2010, 32 pages.
Y,"Conout: CONtextual OUTlier Detection with Multiple Contexts: Application to Ad Fraud", Jan. 2019, 16 pages.
Yang,"Scalable Bayesian rule lists", Apr. 3, 2017, 31 pages.

* cited by examiner

GAUGING CONSUMER INTEREST OF IN-PERSON VISITORS

BACKGROUND

Online retailing has increased dramatically over the last 15 years. Many people now buy not only toys and electronics, but also food, clothing, household appliances, and even cars using the World Wide Web (WWW). To tap into this rapidly growing retail channel, significant efforts have been invested to try to determine the goods and services that might interest consumers by observing on-line behavior. Web page views, mouse clicks, social media likes, search queries, and so forth are monitored and logged in an attempt to understand consumers. This understanding enables companies and marketers to provide more exposure to, more information about, and more opportunities for buying items that consumers may want to purchase.

The monitoring of these aspects of online behavior is just one example of the modern electronic approaches employed to determine the potential interests of consumers. As another example, the different advertisements that people elect to view while browsing the Web are also monitored to determine a person's likely consumer interests. These efforts are undertaken in an attempt to capture the rapidly growing portion of retail sales that is occupied by internet shopping. The focus on, as well as the intense media coverage of, online retailing is understandable given that internet shopping has increased by over 1000% in just the last 15 years. This level of growth and the consequential publicity, however, have led to traditional in-store retailing being overlooked.

Although online retailing has surged in relative popularity, traditional in-store retailing still retains over 90% of consumers' purchasing dollars. Unfortunately, modern, technologically-driven approaches to determining consumer preferences and interests that are applied in the online world have not been applied with equal vigor to the world of traditional in-store retailing. Consequently, companies with physical stores and marketers generally do not have access to technologically-advanced tools to gauge the interests of in-store shoppers. This oversight is all the more surprising given that a person's actual physical behavior can be observed at a physical store.

Thus, conventional technological schemes to obtain marketing information about consumer interests focus on monitoring internet-based behavior, such as tracking browser usage. Because over 90% of shopping is still conducted in traditional brick-and-mortar stores, an overwhelming percentage of consumer shopping behavior is not monitored adequately using current technologies. This oversight leaves a reservoir of consumer interest information largely untapped.

There have been, however, some marketing efforts in the physical world using location-based services. With a location-based service, some service is provided or at least offered to a person based on the person's current location. For example, if an application on a smart phone detects that the user of the smart phone is walking by a frozen yogurt store, the application can generate an alert on the smart phone that informs the user of the presence of the nearby frozen yogurt store or offers a coupon for a discount on a serving of frozen yogurt. This kind of location-based service does enable spatially and temporally relevant information to be provided and offers to be made. Unfortunately, such a location-based service operates without any information as to whether the smart phone user is currently interested in frozen yogurt or even if the user ever eats frozen yogurt. Moreover, the application does not provide insight as to whether the user sometimes eats frozen yogurt, what flavor or toppings the user might be interested in, or any other such information.

SUMMARY

Gauging consumer interest of in-person visitors is described. One tool for potentially stimulating consumer interest in a product is the playing of a video at a venue, such as a physical store, a theater, or another public gathering place. A promotional apparatus presents a video on a display screen, often with a repeating loop. The video is typically professionally prepared and can run for 3-10 minutes or longer. A promotional video can be separated from a content perspective into multiple segments with each segment directed to a subset of the total product features to be covered. For example, with a video directed to a new smart phone, one segment can introduce the new smart phone, and succeeding segments can discuss screen resolution, camera quality, processor and memory specifications, new software capabilities, size and weight, model options and costs, current pricing incentives or deals, and so forth.

In one or more example embodiments that are described herein, a system to gauge consumer interest includes a mobile device, a promotional apparatus, or a server device. A promotional apparatus includes a wireless beacon in addition to a display screen. The promotional apparatus presents on the display screen a video having multiple video segments. While the video is running, the promotional apparatus uses the beacon to facilitate wireless monitoring of the behavior of in-person visitors to gather indicators of consumer interest. The consumer interest indicators are analyzed to ascertain which video segments are likely being watched and are therefore likely to be showing popular product features. Accordingly, consumer interest for a product generally or for specific product features can be gauged using the behavior of in-person visitors.

An example of an indicator of consumer interest includes a distance between a mobile device associated with a visitor and the promotional apparatus along with a temporal parameter, which is referred to herein as a time stamp. The promotional apparatus or the mobile device uses a beacon to determine multiple distances between the visitor's mobile device and the promotional apparatus. A distance may be numerical, such as a number of decimeters, or a distance may be categorical, such as proximate or remote. In an example, three distance categories are: immediate, near, and far, with immediate corresponding to mere centimeters. The multiple distances are determined at particular times, such as regular intervals, that respectively correspond to multiple time stamps. The distances along with the corresponding time stamps are collected over some period of time while the video is playing. The distances can be used to generate a path or other representation of a visitor's movement over time within a venue.

After acquisition of multiple distances along with their associated time stamps, the distances and time stamps are analyzed to infer consumer interest. A collection of distances and time stamps can be analyzed for a single visitor individually or across a multitude of visitors. For a single visitor, distances and associated time stamps are analyzed to determine how long the visitor remains adjacent to, or otherwise in viewing range of, a playing video. In an example situation, a visitor approaches a promotional apparatus from afar and then stops to watch the playing video until the video concludes. This situation can result in consumer interest indicators that include the following proximities while the video is playing and until the video ends: far, far, near, immediate, and immediate. In such a situation, the system can infer that the visitor has an interest in the product being promoted by the video.

A granularity or precision of the analysis of consumer interest indicators can be increased by separating the video being played into video segments that are directed to different product features. The time stamps can be used to link respective distances to respective video segments that are playing when the distances are determined. If distances and time stamps jointly indicate that a visitor elects to watch two segments of a video, which are directed to screen resolution and camera quality, but walks away after another segment directed to processor upgrades starts to play, the system can infer that the visitor is more interested in learning about image quality than hardware specifications.

In response to such a single-visitor inference, a marketer can take one or more steps. For example, the promotional apparatus can be instructed to play video segments directed to image-related features if the visitor is detected to be approaching the promotional apparatus again. An email or application interaction with the visitor can be initiated that reveals additional image-related features or that instead attempts to cover the product features missed by the visitor while in the venue. For multi-visitor inferences, a marketer can determine which video segments were successfully conceived and produced, which product features are inspiring consumer interest across a spectrum of different consumer types, when an aging video no longer inspires sufficient consumer interest, and so forth.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is presented with reference to the accompanying figures. In the figures, the left-most digit or two digits of a reference number identifies the figure in which the reference number first appears. The use of the same reference numbers in different instances in the description and the figures may indicate similar or identical items. Items represented in the figures may be indicative of one or more items, and thus reference may be made interchangeably to single or plural forms of the items in the description.

DETAILED DESCRIPTION

Overview

Figure 1:
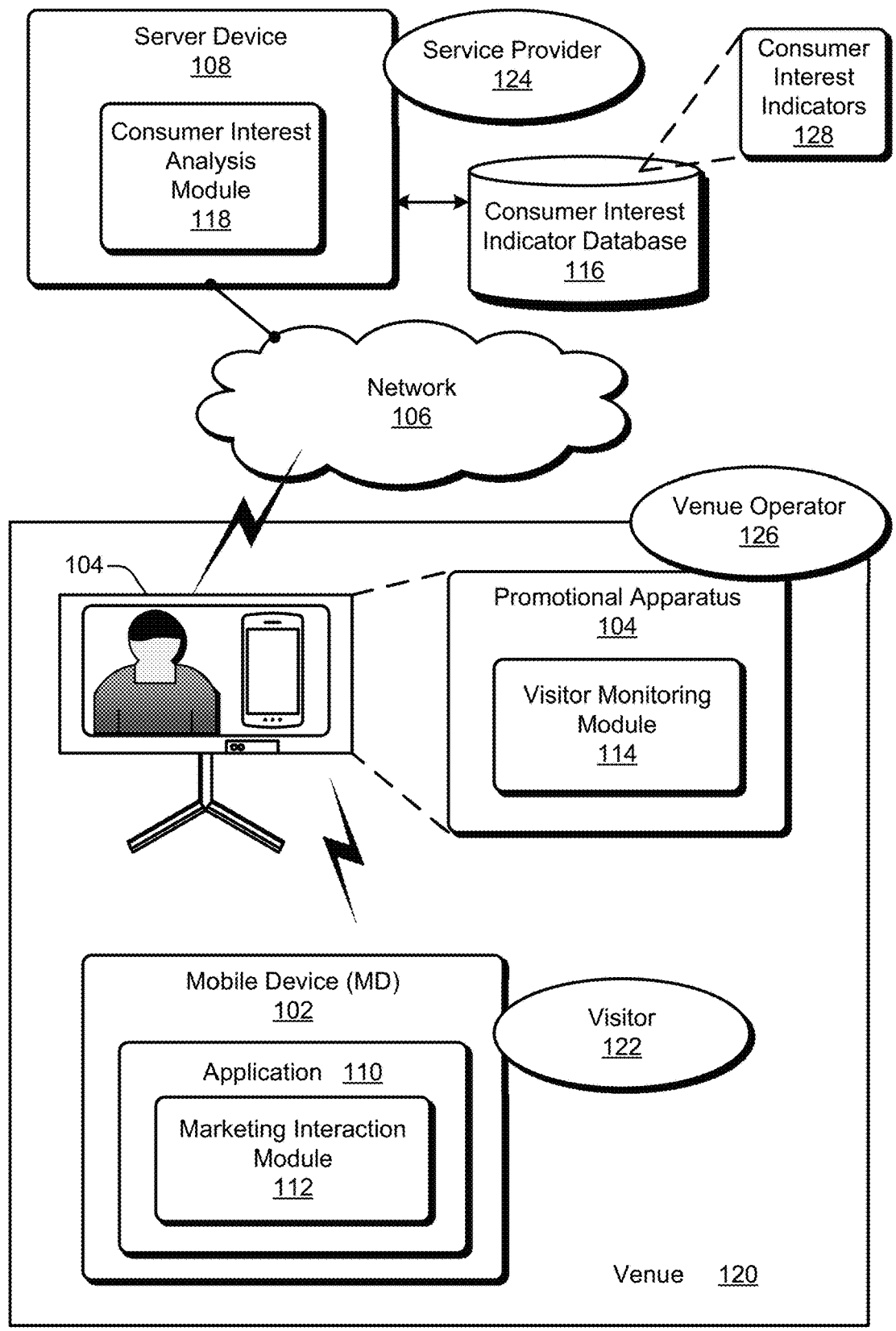
FIG. 1 illustrates an environment for example embodiments that are operable to employ techniques described herein that relate to gauging consumer interest of in-person visitors, with the environment including a mobile device, a promotional apparatus, and a server device.

Embodiments that are described herein enable consumer interest to be gauged by monitoring the behavior of in-person visitors to venues. The consumer interest can be gauged without the visitor having to make a purchase. Further, the consumer interest can be gauged not only with regard to a specific product or product category, but also to the granular level of specific features of a product or a product category. For example, with regard to a frozen yogurt scenario, whether a person is more interested in zero-fat or fruity frozen yogurt may be inferred. Also, whether or not the person is likely to be tempted by a large selection of toppings may be inferred.

In example embodiments, a venue deploys a promotional apparatus including at least one display screen that is used to present a promotional video. A beacon is co-located with the display screen to communicate wirelessly with mobile devices carried by in-person visitors. While the promotional video is being shown on the display screen, the beacon attempts to communicate with any mobile devices that are in range, or mobile devices attempt to communicate with the beacon. If an in-range mobile device is discovered by a beacon, the beacon wirelessly communicates with the mobile device to determine a distance between the mobile device and the beacon. Alternatively, the mobile device can communicate with the beacon to determine the distance. Over time, the position of the mobile device with respect to the display screen is used to infer an interest level of an in-person visitor (e.g., a user of the mobile device) with regard to the content of the video being presented.

Each visitor or mobile device thereof is associated with a visitor identifier. Each promotional apparatus or beacon thereof is associated with an apparatus identification. During wireless communications to determine a distance between the mobile device and the promotional apparatus, the mobile device obtains the apparatus identification, or the promotional apparatus obtains the visitor identifier. The promotional apparatus or a server device can process proximity and other consumer interest indicators to infer the potential consumer interest level of each visitor individually or consumers generally. If the mobile device is reporting proximities, the mobile device submits the visitor identifier, a distance, and a time stamp indicative of when the distance was determined, along with an indication of the promotional video being played. For example, the mobile device can submit the apparatus identification, in conjunction with the time stamp, as the indication of the video. If the promotional apparatus is reporting proximities, the promotional apparatus also submits the visitor identifier, a distance, and a time stamp indicative of when the distance was determined, along with an indication of the promotional video being played. For example, the promotional apparatus can submit the apparatus identification, in conjunction with the time stamp, as the indication of the video. Alternatively, the promotional apparatus can submit the actual name or other video identifier of a promotional video being played when a distance is determined, as well as an indication of what portion of a video is playing—such as by including an elapsed time or video segment identifier.

In either of these two cases, the promotional apparatus can upload to a server device a log of what promotional videos are playing at what times to enable the server device to correlate received time stamps to videos that are being played by the promotional apparatus. The server device may also specify to the promotional apparatus what videos are to be played at what times. Moreover, different portions of a promotional video, called video segments herein, can correspond to different product features. For instance, a three minute frozen yogurt video can be segmented into a first minute devoted to discussing flavors, a second minute showing toppings, and a third minute describing directions and pricing specials. The producer of a promotional video can provide a table indicating which particular product features correspond to which specific video segments. By knowing which time stamps correspond to which video segments and which video segments correspond to which product features, a server device can use time stamps to link mobile device proximities to product features and therefore infer visitor interest in particular product features.

Accordingly, the distance to the mobile device is tracked over time as a representation of the proximity of the mobile device to the promotional apparatus. Once the mobile device is within wireless range, the changing distance to the mobile device with respect to the beacon and associated display screen is monitored. Each distance can be determined at a corresponding time stamp and tagged or categorized based on a likelihood that the in-person visitor can see or is actually looking at the playing video. For example, three distance categories can be used: far, near, and immediate, with each category encompassing a range of distances. If the visitor is far from the display screen, the visitor is assumed to be unable to see or uninterested in seeing the video. If the visitor is categorized as being immediately at the display screen, the visitor is assumed to be watching the video. If the visitor is at a near distance to the display screen, the visitor is deemed to be likely watching the video, possibly in dependence on another factor, which is described next.

A visitor's actual interest in the video being presented, especially at the intermediate distance category of near, can be more strongly inferred using additional factors besides proximity. Examples of additional factors include positioning of the mobile device with respect to the promotional apparatus, a direction of travel of the mobile device, a length of time at a given position, an image acquired by a camera associated with the promotional apparatus, or a combination thereof. For instance, if a visitor walks closer and closer to the display screen, stops at an intermediate near distance to the display screen for two minutes, and then continues onward along the original trajectory, the visitor's interest in at least the viewed portion of the video can be inferred. Also, if a visitor is at a near distance to the promotional apparatus, and a camera detects that the visitor is actually looking at the display screen, then an interest by the visitor can be inferred.

Consumer interest levels in particular product features can also be inferred. To do so, videos are segmented from a content perspective into different video segments that are directed to corresponding specific product features. For instance, a three minute video can be separated into 18 segments that are 10 seconds long apiece. Each video segment may be identified by a time index that elapses as the video plays. The proximity data is linked temporally to the presentation of individual video segments of the promotional video using the time stamps. Consequently, the specific video segments that are playing when the visitor is close to and stopped at a display screen can be identified. If a visitor pauses (e.g., ceases walking) to watch video segments that show what frozen yogurt flavors are available at a nearby frozen yogurt shop but leaves before the video ends and right after the video segments directed to toppings start to play, a reasonable inference is that the visitor's interest in frozen yogurt is more likely to be swayed by a particular selection of yogurt flavors than any particular availability of yogurt toppings.

Proximity between mobile device positions and beacons, durations of periods at particular positions, linkages between proximities and video segments, or other indicators of consumer interest can be uploaded from the promotional apparatus, the mobile device, or a combination thereof to a server device in the cloud for analysis. For example, the promotional apparatus can upload a log of when each video and video segment thereof is played, and the mobile device can upload proximities and indications of when the proximities were determined using time stamps. The analysis can reveal a person's potential interest in the promoted product of the video and specific features of the promoted product. These indicators, as well as the amount of consumer interest that is inferred from the indicators, can be amalgamated across multiple mobile devices or associated visitors. The amalgamated indicators are used to infer what products people are likely to be interested in generally, what specific features inspire the most interest, and so forth. Also, in-store sales associates can use such information to know, for instance, which product features should be highlighted first when a customer enters a physical store. Store owners can learn which overall products and what product features interest customers the most. For instance, an owner of a frozen yogurt shop can use inferred consumer interest to determine that available square footage of the shop should be devoted to offering two more yogurt flavor options instead of four more topping choices if most viewers of the video focus on yogurt flavors instead of yogurt toppings.

In these manners, technology can be deployed in brick-and-mortar stores to gauge consumer interest in products by monitoring the behavior of visitors. The consumer interest can pertain to an overall product based on whether in-person visitors are watching a promotional video. Consumer interest can also pertain, at a finer granularity level, to particular product features by linking times that in-person visitors are watching a promotional video to particular product features that are being highlighted by the promotional video in video segments being presented during those times.

Generally, multiple different visitor behaviors may be monitored to detect or identify consumer interest indicators. Some visitor behaviors and inferences based thereon pertain, for example, to individual visitors. First, whether a visitor is interested in a product generally may be inferred. Second, particular product features that may interest a given visitor can be inferred based on the video segments that are running while the visitor remains in viewable range of the playing video. Third, the existence of product features that are more likely to be unknown to a visitor may be inferred based on missed video segments. Fourth, for each visitor the system can infer if a given visitor is a high value prospect, a good value prospect, or a reasonable value prospect. Other behaviors pertain to visitors as a group. First, for general marketing purposes, the system can also infer which product features are generally attracting the attention of in-person visitors and which product features are generally failing to attract the attention of in-person visitors. Second, based on the number of visitors that are interested currently versus those that were interested historically, a marketer can compare consumer interest data for different products over time to determine a how interest has changed. This enables a marketer to adjust the deployment of, or update the content of, promotional videos accordingly. Generally, analyzing consumer interest indicators to determine which product features attract the most attention from in-person visitors can be used to rank the product features in terms of relative consumer interest. A marketer can use this ranking of product features to ascertain which product features should be the focus or emphasis for advertising other goods or services in the same product category.

Demographic data for in-person visitors can also be obtained. If demographic data is available for each visitor identifier, the system can filter or organize consumer interest indicators, inferred consumer interest, inferred product feature preferences, and so forth by different demographically-based characteristics. The system can therefore ascertain which particular products or product features interest different demographic groups. These different consumer interest indicators, as well as various interests that are inferred therefrom, can be used to produce reports for marketers, store owners, and so forth. For individual visitors, reports can enable marketers to retarget users based on their interests, to enrich profiles of individual users, to focus marketing content for individual users, and so forth. For visitors as a whole or for groups of visitors, reports enable marketers to intelligently select what features should have a greater marketing push behind them, to determine efficient outlays of marketing resources for future advertising campaigns, to provide valuable feedback to guide research and development efforts, and so forth.

In the following discussion, after some example terminology is set forth, an example environment is described that may employ the techniques described herein. Example embodiment systems, machines, and techniques are then described, followed by a section explaining example embodiment procedures and processes. The procedures and processes may be performed in the example environment and systems as well as in other environments. However, performance of the example procedures is not limited to the example environment, and the example environment and systems are not limited to performance of the example procedures.

Terminology Examples

Example descriptions or explanations of certain terms as used herein are set forth below. Each term is applicable to one or more, but not necessarily all, embodiments that are presented herein. Some terms are further elucidated using one or more examples.

A "venue" may refer to a physical place that permits or encourages people to gather publicly for some purpose. A venue can be any public location where people congregate, walk-by in passing, socialize, spend money, and so forth. Examples of a venue include a physical store, a theater, an amusement park, an airport, a train or bus station, a park, a concert hall, a convention center, a sports arena or stadium, a restaurant, a hotel, a zoo, or a combination thereof.

"In-person visitor behavior" may refer to movement with respect to a physical promotional apparatus by a visitor that is physically-present at a brick-and-mortar store or other venue. An in-person visitor contrasts with a visitor to a Web storefront or other website and can include a person outside of the premises of a venue that is nevertheless capable of viewing a promotional video that is playing within the venue. Examples of in-person visitor behavior include proximity to the promotional apparatus, changes in distance to the promotional apparatus, directions of travel, changes in directions of travel, durations of time at which a distance remains constant, positions of the visitor with respect to the promotional apparatus, or combinations thereof.

A "promotional apparatus" may refer to a physical device or manufacture that is capable of presenting a video at a venue to promote a product. A promotional apparatus can include a beacon or a display screen. A "beacon" may refer to a component that wirelessly communicates with a mobile device. A beacon may be capable of remotely determining the presence of, or monitoring a distance to, a mobile device. Additionally or alternatively, a beacon may be adapted to broadcast an identification of the beacon or an associated promotional apparatus and to participate in a ranging operation so that a mobile device can determine a distance between the mobile device and the beacon. A "display screen" may refer to a screen that is capable of playing a video.

A "video" may refer to a moving picture or short film. A promotional video is directed to a product or set of products, which can be goods or services, being promoted in a physical store or other venue, such as a theater, sports arena, or amusement park. A video may include multiple video segments. A "video segment" may refer to a portion of a video that may be directed to at least one product feature of a product being promoted. Video segments may be defined based on elapsed time or content being shown. Video segments of a given video may be of similar lengths or different lengths.

A "visitor identifier" may refer to an alphanumeric value or code that is associated with a visitor, a mobile device thereof that is temporarily entering the premises of a venue, or an application executing on the mobile device. Examples of a visitor identifier include a personal name, a customer number, a phone number, an account name or user identification, an International Mobile Station Equipment Identity (IMEI) number, a mobile device identifier, an identifier for advertising (IDFA), an advertising ID, a unique application identifier, or combinations thereof. A "mobile device" may refer to a computing device that is associated with a visitor and can be carried into a venue. Examples of a mobile device include a smart phone, a smart watch, intelligent glasses, a tracking or other type of chip implant, an electronic ring, another portable communications device, or combinations thereof. A mobile device can transmit the visitor identifier to a promotional apparatus as part of a distance ranging procedure, and the promotional apparatus can forward the visitor identifier to a server device having a consumer interest analysis module that processes consumer interest indicators. Alternatively, the mobile device can transmit the visitor identifier directly to the server device as part of a procedure to report distances that are determined between the mobile device and the promotional apparatus.

"Consumer interest" may refer to whether or how much a shopper at a store or a potential purchaser wishes to learn about or enjoys learning about a product or product features, especially because the consumer might buy or influence the buying of the product. A "consumer interest indicator" may refer to a measurement, a characteristic, a datum, or a combination thereof that may be used to infer a level of consumer interest. Examples of a consumer interest indicator include a proximity, a distance, a position, or a combination thereof, with or without a time stamp enabling a temporal parameter overlay to be applied to spatial indicators.

A "proximity" may refer to how close or far one physical object is to another physical object. A proximity can be measured in terms of, or represented by, a distance. A "distance" may refer to a linear measurement or length of physical space. A distance may be estimated, approximated, numerical, categorical, some combination thereof, and so forth. Examples of a distance include a length of seven feet, a range of 2-10 meters, a category such as near or far, or a combination thereof.

A "time stamp" may refer to a temporal indication associated with a determination of proximity or distance. A time stamp can be an instantaneous time or a time period. Examples of time stamps include a time at which a distance is determined, a time slot during which a distance is determined, a time of day or absolute time, an identification of a video segment, a time index corresponding to the elapsed time of a playing video, a time slot or time period, or a combination thereof.

A "linkage" may refer to an association between two objects or items. For example, a determined distance may be linked to a video segment via a time stamp. Examples of a linkage include a pointer, joint inclusion in a data structure or associated fields thereof, matching codes, a digital reference of one to the other, a contemporaneous occurrence as ascertainable from at least one datum—such as an absolute time for a distance determination in conjunction with an absolute start time for a video being presented, or combinations thereof.

Also, unless context dictates otherwise, use herein of the word "or" may be considered use of an "inclusive or," or a term that permits inclusion or application of one or more items that are linked by the word "or" (e.g., a phrase "A or B" may be interpreted as permitting or being relevant to just "A," to just "B," or to both "A" and "B").

Example Environment

FIG. 1 illustrates an environment 100 for example embodiments that are operable to employ techniques described herein that relate to gauging consumer interest of in-person visitors. As shown, the example environment 100 depicts a consumer interest gauging system and includes a mobile device 102, a promotional apparatus 104, a network 106, and a server device 108. The consumer interest gauging system includes a marketing interaction module 112, a visitor monitoring module 114, or a consumer interest analysis module 118. The mobile device 102 includes an application 110 and the marketing interaction module 112. The promotional apparatus 104 includes the visitor monitoring module 114. The server device 108 includes the consumer interest analysis module 118. The environment 100 further includes a consumer interest indicator database 116, a venue 120, a visitor 122, a service provider 124, and a venue operator 126. The consumer interest indicator database 116 stores consumer interest indicators 128. The venue operator 126 can be, for example, an owner of the venue 120, the manager of the venue 120, a retail company, a hospitality company, or a combination thereof.

In one or more embodiments, the marketing interaction module 112 of the mobile device 102, the visitor monitoring module 114 of the promotional apparatus 104, or the consumer interest analysis module 118 of the server device 108 work together to implement systems and techniques for gauging consumer interest of in-person visitors as described herein. The promotional apparatus 104 is deployed at a venue 120. Examples of a venue 120 include a discount store, a big-box store, a department store, a boutique, a store in an indoor mall, a store in a strip mall, a restaurant, a convenience store, a gas station, a theater, a sports arena, an amusement park, an airport, a train or bus station, or another public place where people congregate, pass through, dine, or spend money. If a mobile device 102 enters the venue 120, or otherwise comes into range of the promotional apparatus 104, the promotional apparatus 104 communicates with the mobile device 102 to obtain consumer interest indicators 128, an example of which is a proximity of the mobile device 102 to the promotional apparatus 104. Alternatively, the mobile device 102 communicates with the promotional apparatus 104 to obtain consumer interest indicators 128. The mobile device 102 or the promotional apparatus 104 communicates with the server device 108 via the network 106 to provide the obtained consumer interest indicators 128.

The server device 108 includes or has access to the consumer interest indicator database 116, which stores consumer interest indicators 128 for analysis. The service provider 124 is associated with the server device 108 or with the consumer interest indicator database 116. Generally, the service provider 124 may be a company, corporate division, or other entity that provides marketing, analytics, consumer research, or other services to stores, other divisions within a company, or separate retail companies, such as with an implementation in which the venue operator 126 is a store owner. The service provider 124 is associated with (e.g., owns, leases, or manages) the server device 108 and causes execution of the consumer interest analysis module 118 located at the server device 108. The example scenario as illustrated in the top half of FIG. 1 may be considered a "cloud-based" computing environment in which the service provider 124 provides services to the venue operator 126; the visitor 122; a retailer, a wholesaler, or a manufacturer of a product being promoted; another division of the service provider 124; or a combination thereof using the server device 108 that forms part of "the cloud."

The consumer interest analysis module 118 executes on the server device 108 to analyze consumer interest indicators 128 to infer potential consumer interest of in-person visitors. Examples of a server device 108 include one or more web servers, a server or group of servers running open source software, server(s) of a proprietary design, a stand-alone server, a server blade, an allocated portion of a server farm, server functionality distributed across at least one data center, cloud computing functionality, or some combination thereof. Although a single server device 108 is explicitly shown in FIG. 1, a server device 108 may be representative of a plurality of different devices or distributed computing resources that interoperate or coordinate to perform operations as a "web service," "over the cloud," or "in the cloud" as is known. There may be separate servers or groups of servers allocated for communicating with the mobile device 102 and for communicating with the promotional apparatus 104 while the consumer interest analysis module 118 may run on yet another set of servers.

The mobile device 102 or the promotional apparatus 104 can be in communication with the server device 108, or vice versa, via at least one network 106. The network 106 may be formed from at least a portion of one or more network types. Examples of network types include a public network, a private network, the Internet, the Web, an Ethernet, an intranet, an extranet, a local area network (LAN), a wide area network (WAN), a wireless network, a wired network, a cellular network, an infrastructure network, an ad hoc network, a Bluetooth network, a Wi-Fi network, a Long-Term Evolution (LTE) network, a public-switched telephone network (PSTN), or some combination thereof.

A promotional apparatus 104 may be deployed at strategic locations around the venue 120 by the venue operator 126 or a contracted marketing or display company. Example locations include entryways, near check-out stations, next to changing rooms, by a promoted product, secured to a wall, on top of a display case, connected to a stand, or some combination thereof. The promotional apparatus 104 includes a display screen to present a video, such as a promotional video for a product, and a beacon for wireless communications. The beacon is capable of wirelessly communicating with the mobile device 102. Example embodiments for a promotional apparatus 104 are described below with reference to FIG. 2.

The mobile device 102 is associated with the visitor 122, which can be the owner or end-user of the mobile device 102. Upon entry, the visitor 122 is visiting the venue 120 to shop, purchase, research products, socialize, browse displays, view demonstrations, enjoy entertainment, take public transportation, and so forth. The visitor 122 has authorized the application 110 to communicate with the promotional apparatus 104 for marketing purposes, such as to receive product information and sale offers of likely interest to the visitor 122. The application 110 may be a retailer or store-specific application, a credit card or bank-related application, a news application, a media application, a publishing-company application, a gaming application, a social network application, a navigational application, and so forth. Although the marketing interaction module 112 is shown as part of the application 110, the marketing interaction module 112 may alternatively be a stand-alone application, part of the operating system (OS) of the mobile device 102, and so forth. The marketing interaction module 112 executes on the mobile device 102 to communicate wirelessly with the visitor monitoring module 114, a beacon of the promotional apparatus 104, or the server device 108.

The mobile device 102 may be implemented as or may be configured as any suitable type of computing device. Examples of a mobile device 102 include a laptop computer, a portable device (e.g., assuming a handheld configuration such as a tablet, a mobile phone, or a phablet), a mobile device coupled to a separate screen, a hand-held game console, a wearable computing device such as a smart watch or intelligent glasses or clothing, or some combination thereof. Thus, a mobile device 102 may range from a relatively high-resource device with substantial memory and processor resources (e.g., a smart phone) to a relatively low-resource device with constrained memory or processing resources (e.g., an electronic ring or other jewelry).

The marketing interaction module 112, the visitor monitoring module 114, or the consumer interest analysis module 118 represents at least a portion of the functionality to implement schemes and techniques for gauging consumer interest of in-person visitors as described herein. Each module may be implemented as at least part of a software package that is stored in memory and executes on and specially configures one or more processors; as a hardware device or apparatus; or using a combination of software, hardware, firmware, or fixed logic circuitry; with some combination thereof; and so forth. Examples of hardware and associated logic are described herein with particular reference to FIG. 10. Each of the modules may be implemented as a standalone component of a device or apparatus. Additionally or alternatively, a module may be implemented as a component of another application, as a component of an OS of a device or apparatus on which it is executing, as a plug-in or extension module, as a standalone service or as a service integrated with other services, as another device application or functionality, as an application programming interface (API) available to another program, or a combination thereof, and so forth.

Having considered an example environment, consider now a discussion of some example details of systems, techniques, and schemes for gauging consumer interest of in-person visitors in accordance with one or more embodiments.

Systems and Techniques

Figure 2:
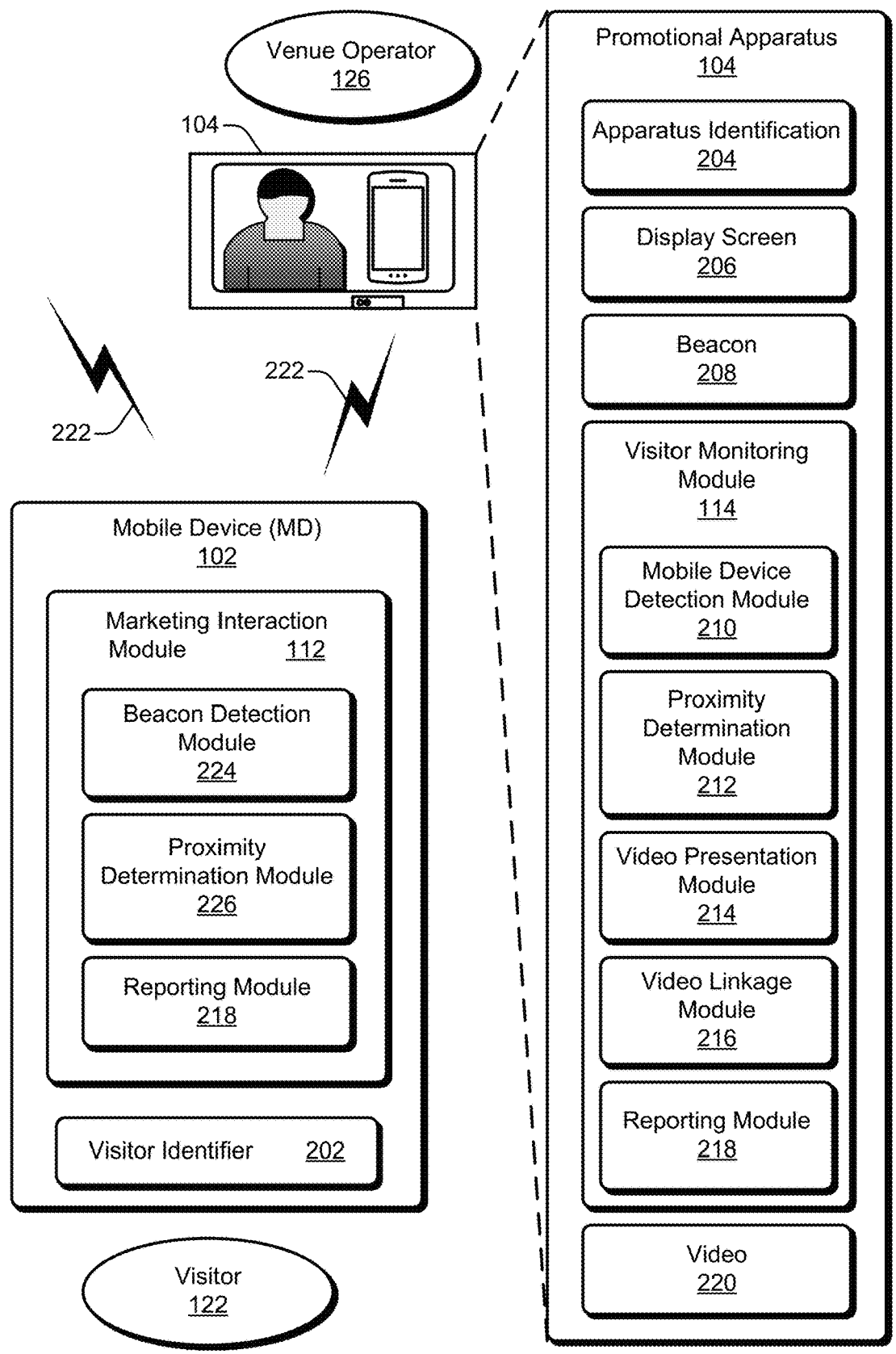
FIG. 2 illustrates an example embodiment of a mobile device and an example embodiment of a promotional apparatus that is capable of presenting a video.

FIG. 2 illustrates, generally at 200, example embodiments of a mobile device 102 and a promotional apparatus 104. As shown, the mobile device 102 includes a visitor identifier 202 in addition to the marketing interaction module 112. The visitor identifier 202 is associated with the mobile device 102, the marketing interaction module 112, or the visitor 122. The visitor identifier 202 represents the mobile device 102, the marketing interaction module 112, or the visitor 122 with respect to the consumer interest gauging system. Examples of the visitor identifier 202 include a phone number, a mobile subscriber Integrated Services for Digital Network (ISDN) (MSISDN) number, an International Mobile Station Equipment Identity (IMEI) number, an alias, an assigned or user-selected account name or number, a user identification, an email address, a web browser cookie, an advertising identification, or some combination thereof. The marketing interaction module 112 includes a beacon detection module 224, a proximity determination module 226, and a reporting module 218.

As illustrated, the promotional apparatus 104 includes an apparatus identification 204, a display screen 206, a beacon 208, the visitor monitoring module 114, and a video 220. The visitor monitoring module 114 may include a mobile device detection module 210, a proximity determination module 212, a video presentation module 214, a video linkage module 216, or a reporting module 218. The illustrated components of the promotional apparatus 104 may be separated into one or more different devices or housings or may be integrated within or on a single housing of one device. In some implementations, a visitor monitoring module 114 may include fewer than the illustrated five modules.

The display screen 206 is capable of presenting (e.g., playing or showing) the video 220. The display screen 206 can be implemented as a liquid crystal display (LCD) screen, a light emitting diode (LED) display screen, a video projector, and so forth. The beacon 208 is capable of wirelessly communicating with the mobile device 102 via a wireless communication 222. The beacon 208 may be realized with any wireless component that is capable of participating in a wireless ranging procedure. The beacon 208 may be compatible with Wi-Fi technology (e.g., one or more IEEE 802.11 standards), Bluetooth® technology (including Bluetooth Low Energy (BLE)), other short-range wireless standards, or wireless technology generally. A beacon 208 may be implemented, by way of example but not limitation, in accordance with iBeacon® technology from Apple®, or as some type of radio frequency identification (RFID) device. The video 220 is stored locally at the promotional apparatus 104. Alternatively, the video 220 can be streamed from a remote location, such as from the server device 108 or a cloud-based video source.

In example embodiments for a mobile device 102, the beacon detection module 224 of the marketing interaction module 112 monitors wireless communications 222 to detect a beacon 208 that is in wireless range of the mobile device 102. Because the beacon 208 is associated with the promotional apparatus 104, which is adapted to present the video 220 on the display screen 206, the beacon 208 broadcasts the apparatus identification 204. The apparatus identification 204 may, for instance, include or be derived from a beacon identifier of the beacon 208. The proximity determination module 226 determines a distance to the beacon 208 using one or more wireless communications 222 transmitted between the mobile device 102 and the beacon 208 of the promotional apparatus 104. The reporting module 218 associates the apparatus identification 204 and the determined distance with the visitor identifier 202. The reporting module 218 also reports the visitor identifier 202 in association with the apparatus identification 204 and the distance determined between the mobile device 102 and the promotional apparatus 104 using at least one wireless communication 222. The wireless communication 222 may be transmitted to the promotional apparatus 104 or to a server device 108 to report the distance. Embodiments for a mobile device 102 that is reporting proximity to a server device 108 are described with reference to FIG. 3. In some embodiments, the mobile device 102 may detect more than one beacon 208 in the area and report a distance from each. The proximity determination module 226 or the reporting module 218 of the mobile device 102, the mobile device detection module 210 or the proximity determination module 212 of the promotional apparatus 104, or the consumer interest analysis module 118 of the server 108 may use trilateration or a similar technique to more accurately identify the position of the mobile device 102. For example, trilateration enables the determination of whether the mobile device 102 is in front of, behind, or to the side of the display screen 206, and thus the extent to which the video 220 playing on the display screen 206 is visible to the visitor 122.

In example embodiments for a promotional apparatus 104, the mobile device detection module 210 uses at least one wireless communication 222 with a mobile device 102 to detect that the mobile device 102 is in wireless range of the beacon 208. The proximity determination module 212 determines a distance to the mobile device 102. The video presentation module 214 presents the video 220 on the display screen 206. The video 220 includes multiple video segments, which are described further with reference to FIG. 5. The video linkage module 216 ascertains from the multiple video segments a video segment that is playing in conjunction with the determination of the distance to the mobile device 102. The video linkage module 216 also associates the visitor identifier 202 with the determined distance and the ascertained video segment. The reporting module 218 reports the visitor identifier 202 and the determined distance in association with the ascertained video segment to a server device 108 or cloud service. Embodiments for a promotional apparatus 104 that is reporting proximity to a server device 108 are described with reference to FIG. 3.

Figure 3:
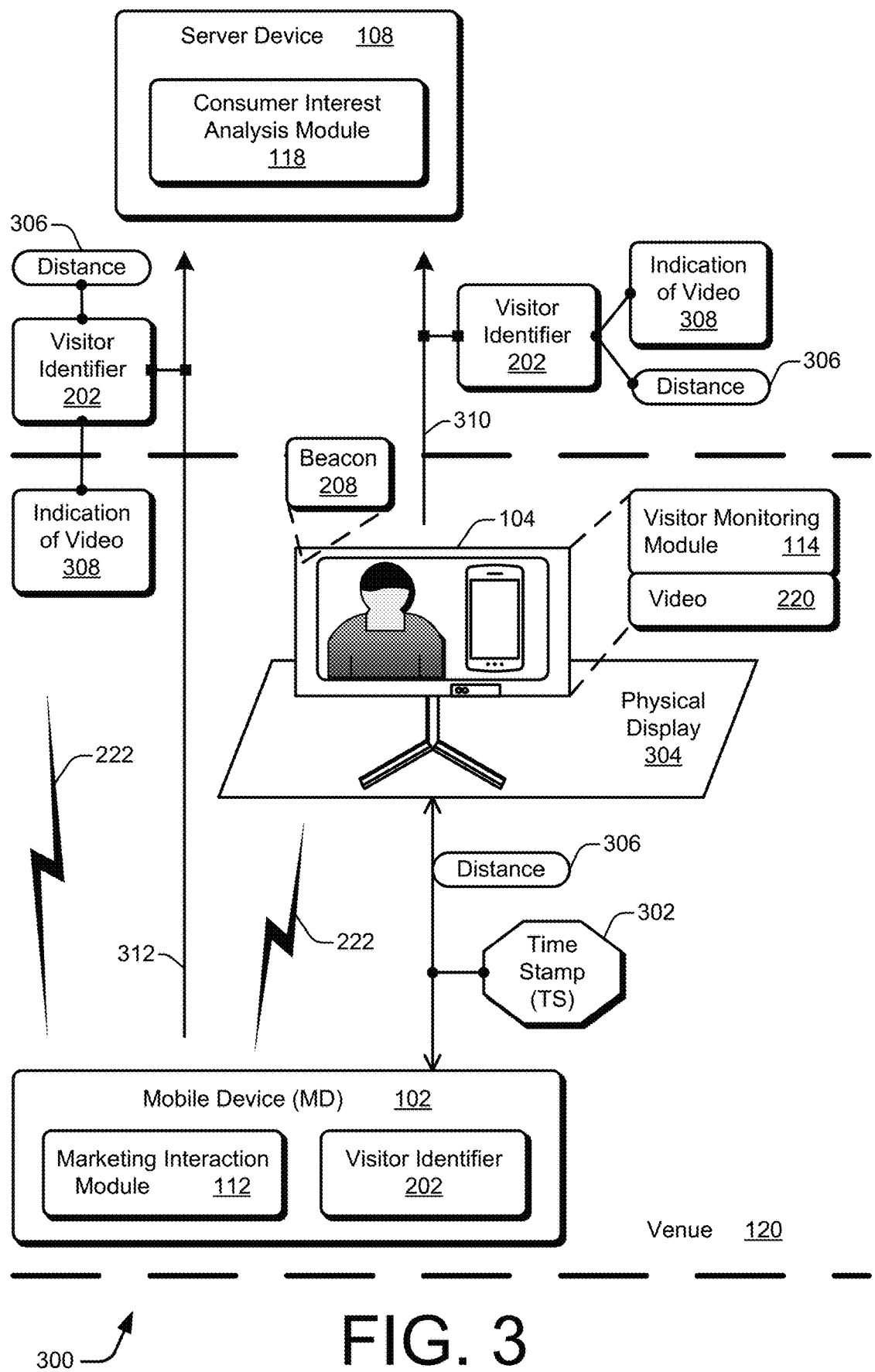
FIG. 3 illustrates an example operative interaction between and among the mobile device, the promotional apparatus, and the server device.

FIG. 3 illustrates an example operative interaction 300 between and among the mobile device 102, the promotional apparatus 104, and the server device 108. The operative interaction 300 depicts the mobile device 102 within the venue 120. The venue 120 includes a physical display 304, such as a cabinet, a stand, a shelf, a table, a wall, a screen, a sign, and so forth. The venue operator 126 has deployed the promotional apparatus 104 at the physical display 304. The promotional apparatus 104 is presenting the video 220. The beacon 208 is incorporated as part of the promotional apparatus 104 or co-located with the promotional apparatus 104.

In example embodiments, the promotional apparatus 104, via the beacon 208, communicates wirelessly with the mobile device 102 as indicated by the wireless communication 222 on the right that is depicted as extending between the two. Under the direction of the visitor monitoring module 114, the proximity of the mobile device 102 to the promotional apparatus 104 is determined. The proximity is represented by a distance 306 between the mobile device 102 and the promotional apparatus 104. The beacon 208 can determine the distance 306 using any approach involving wireless communications 222, such as time of flight (TOF) for a wireless transmission. A time associated with a determination of the distance 306 is called a time stamp 302 herein. The visitor monitoring module 114 also obtains the visitor identifier 202 from the mobile device 102.

In embodiments in which the promotional apparatus 104 is responsible for reporting proximity, the visitor monitoring module 114 transmits the visitor identifier 202 from the promotional apparatus 104 to the server device 108 as indicated by the communication 310. The communication 310 may include one or more propagation portions that are effectuated wirelessly or by wire. The visitor identifier 202 is communicated in association with the distance 306. The promotional apparatus 104 can also communicate an indication of the video 308. The indication of the video 308 can be implemented as a string, a code, a name, a pointer, an alphanumeric value, a combination thereof, and so forth that enables the consumer interest analysis module 118 to identify the video 220 that is being presented. Examples of such an indication include a name of the video, the apparatus identification 204, a handle for the video, and so forth. The apparatus identification 204 can serve to identify a video if a particular video and a corresponding playing time are announced or otherwise known for a given promotional apparatus 104. For instance, the server device 108 can assign a video to a promotional apparatus 104 and specify a playing time such that the server device 108 therefore knows what video or video segment is playing on the promotional apparatus 104 at any given time.

In embodiments in which the mobile device 102 is responsible for reporting proximity, the marketing interaction module 112 transmits the visitor identifier 202 from the mobile device 102 to the server device 108 as indicated by the communication 312. The communication 312 may include one or more propagation portions that are effectuated by wire or wirelessly (e.g., a portion over a Wi-Fi or cellular network plus another portion over the Internet). The visitor identifier 202 is communicated in association with the distance 306. The marketing interaction module 112 can receive the distance 306 from the visitor monitoring module 114. Alternatively, the marketing interaction module 112 can determine the distance 306 using a ranging operation involving one or more wireless communications 222 exchanged with (e.g., transmitted to or received from) the beacon 208. Also, other distance determining techniques may be used in the system, such as by comparing satellite positioning system (SPS) coordinates of one device with geospatial coordinates of another device. The mobile device 102 can also communicate an indication of the video 308 to the server device 108. As described above, examples of the indication of the video 308 include a name of the video, the apparatus identification 204 (e.g., a beacon identifier), a handle for the video, and so forth In other embodiments, the mobile device 102 and the promotional apparatus 104 jointly provide consumer interest indicators. For example, the promotional apparatus 104 sends message communications to the server device 108 identifying each video segment of the video 220 as the segment is displayed, along with time stamps 302 for the start time and end time of the segment. These video-identifying message communications may be sent in real-time, such as after each time stamp 302, or batched and sent periodically. The mobile device 102 sends to the server device 108 apparatus identifications 204, such as beacon identifiers, and time stamps 302, as well as associated distances 306. The server device 108 searches for the respective video segment that was being displayed by the promotional apparatus 104 for the corresponding promotional apparatus 104/beacon 208 at respective time stamps 302. The mobile device 102 can send the apparatus identification, distance, and time stamp information to the server device 108 periodically, such as every few seconds. Alternatively, the mobile device 102 can accumulate the information and send the information as a batched group at a longer interval or after the mobile device 102 no longer detects the beacon 208. Regardless, in these embodiments, the server device 108 is responsible for matching the apparatus identification 204 and the time stamps 302 with the video segments that were playing at those time stamps 302. Generally, the mobile device 102 or the promotional apparatus 104 may send raw data to the server device 108, and the server device 108 can perform any of the analysis that is described herein as being performed by the mobile device 102 or the promotional apparatus 104, such as trilateration for mobile device positioning, determining if a user is in front of a display screen, determining what video segment is being played at what measured distance, and so forth.

A distance 306 can be expressed exactly, to a precision feasible for a given measuring technique, as a range, and so forth. A distance 306 can be expressed numerically, such as in feet or meters. Alternatively, a distance 306 can be expressed categorically. An example of a set of distance categories is: adjacent, close, intermediate, distant, and, remote. Another example set of distance categories has been adopted by Apple® for iBeacon®-compatible technologies. These three distance categories are immediate, near, and far. The immediate category is an approximate distance range up to a few centimeters. The near category is an approximate distance range between a few centimeters and a couple of meters. The far category is an approximate distance range between 10 meters and 70 meters.

Figure 4:
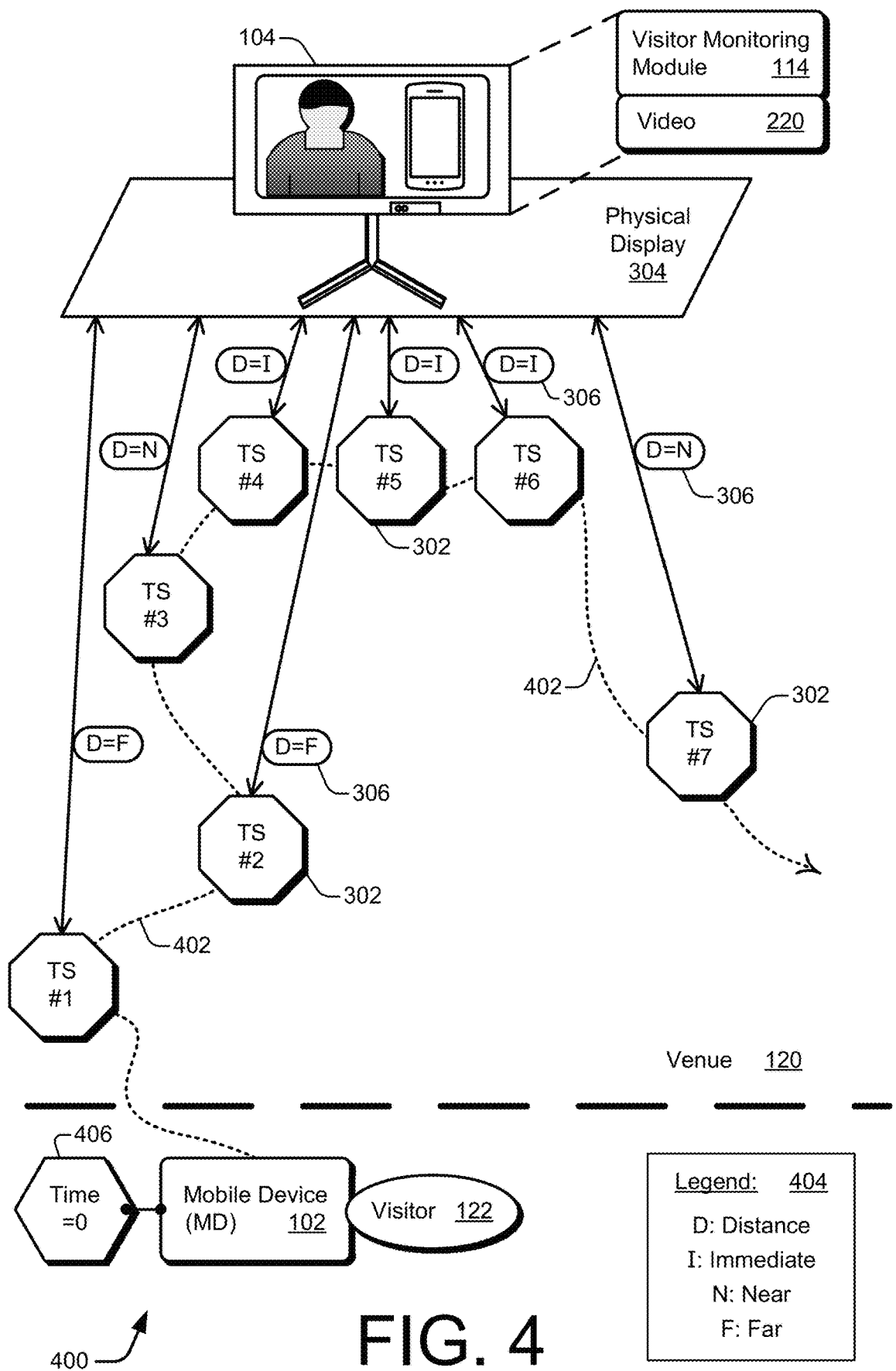
FIG. 4 illustrates an example path of movement of the mobile device in the vicinity of the promotional apparatus so as to be at different distances from the promotional apparatus at different time stamps.

FIG. 4 illustrates, generally at 400, an example path of movement 402 of the mobile device 102 in the vicinity of the promotional apparatus 104 so as to be at different distances 306 from the promotional apparatus 104 at different time stamps 302. Some of the reference numbers for the time stamps 302 and the distances 306 are omitted for the sake of visual clarity. The positions of the mobile device 102 along the path of movement 402 are indicated by the corresponding time stamp 302 of time stamps #1-#7. A distance 306 between the mobile device 102 and the promotional apparatus 104 at each position is shown. A legend 404 indicates that the letter "D" represents "distance," the letter "I" represents "immediate," the letter "N" represents "near," and the letter "F" represents "far." These three distance categories correspond to a set of categories for an example iBeacon®-compatible implementation, but other distances may alternatively be used. Initially, the mobile device 102 is external to the venue 120 and out-of-range of the beacon 208 of the promotional apparatus 104 as represented by the time=0 indicator 406.

After entering the venue 120 and going into wireless range of the promotional apparatus 104, the promotional apparatus 104 determines a far distance (D=F) at the #1 time stamp. Meanwhile, a video is being presented on the display screen of the promotional apparatus 104. At the #2 time stamp, although the mobile device 102 has moved closer to the promotional apparatus 104, another far distance is determined. At the #3 time stamp, on the other hand, the mobile device 102 has been carried by the associated visitor 122 into a new distance category. As shown, the promotional apparatus 104 determines that the mobile device 102 is at a near distance (D=N) for the #3 time stamp.

By the time the mobile device 102 is within the near range as of the #3 time stamp, the system assumes that the associated visitor 122 can see the video playing on the promotional apparatus 104. At the #4 time stamp, the visitor 122 has moved still closer to the promotional apparatus 104. The promotional apparatus 104 determines that the mobile device 102 is at an immediate distance (D=I) at the #4 time stamp. The visitor 122 remains within the immediate range at the #5 time stamp and at the #6 time stamp while the video continues playing in this example. The promotional apparatus 104 also determines these two distances 306. After the video ends, at the #7 time stamp, the promotional apparatus 104 determines that the mobile device 102 has moved back into the near distance category range.

The system thus detects that the mobile device 102 approaches the display screen while the video is playing, remains close to the playing video until the video ends, and is then carried away from the promotional apparatus 104 after the video ends. The system can therefore infer that the visitor 122 was engaged by the video and is interested in the promoted product shown on the video. Generally, the system can determine if a visitor remains at one position, remains at an engaged proximity, or a combination thereof, for some threshold period of time. The threshold period of time may be predefined, specified by a marketer or store owner, dependent on an average speed of movement by an individual visitor over time or by multiple venue visitors around when the distance is determined, dependent on how quickly or often a promotional video changes topics, some combination thereof, and so forth. If relative positioning is also determined, the system can infer a stronger interest in this example by the visitor 122 because the directions of travel toward the promotional apparatus 104 during the video 220 and away from the promotional apparatus 104 after the video 220 ends are in somewhat of opposite directions. Hence, it appears that the playing video 220 attracted the visitor 122 to the location of the promotional apparatus 104, instead of merely causing the visitor 122 to pause along another trajectory. Additionally, whether the visitor 122 might be more interested in some product features than other product features can be determined by segmenting the video, which is described with reference to FIG. 5.

Figure 5:
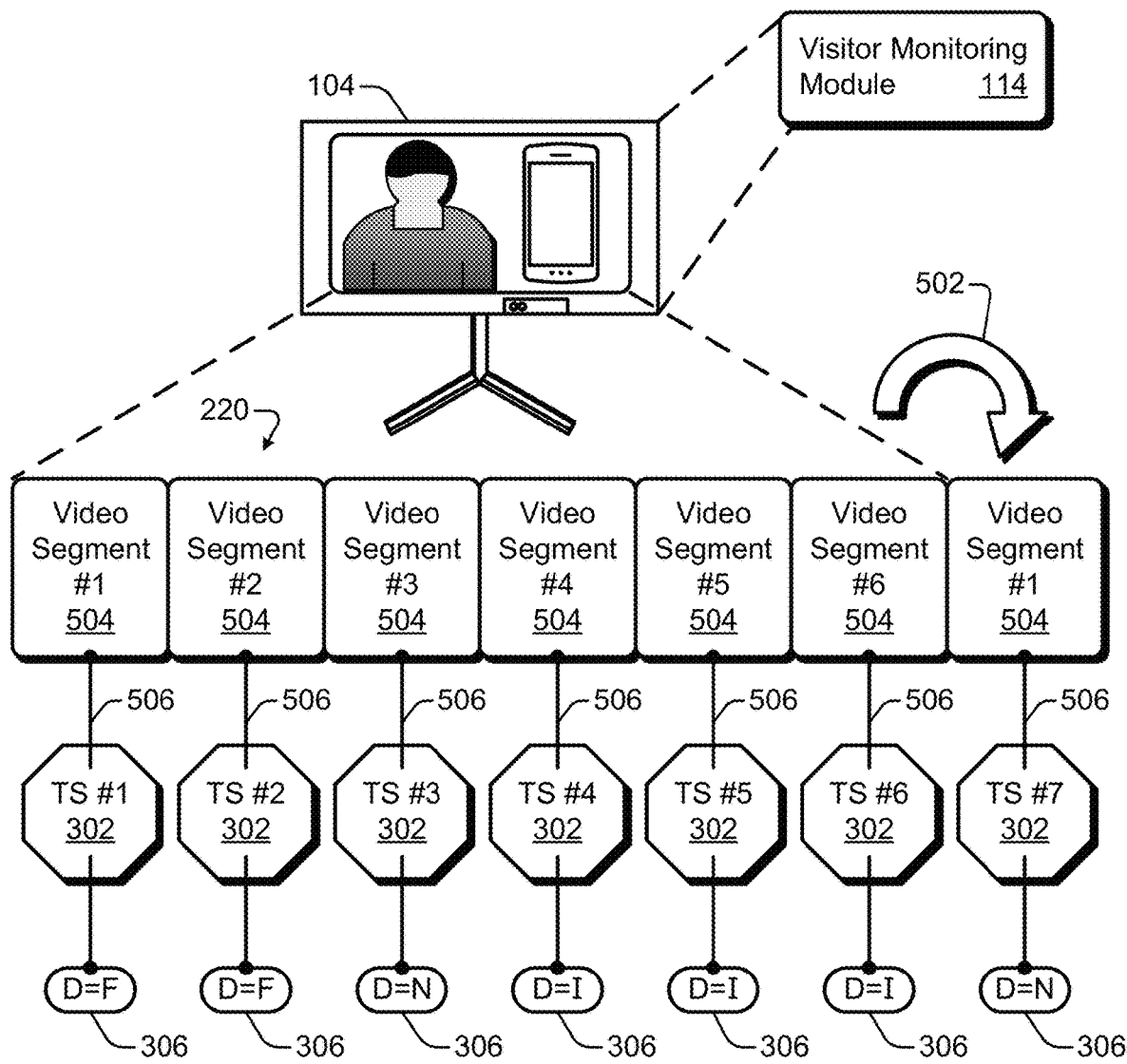
FIG. 5 illustrates an example approach to creating linkages between multiple distances and multiple video segments of a video based on different time stamps.

FIG. 5 illustrates an example approach 500 to creating linkages 506 between multiple distances 306 and multiple video segments 504 of the video 220 based on different time stamps 302. To enable a finer gauging of consumer interest having increased granularity for individual product features, the video 220 is separated into video segments 504. In this example, the video 220 includes six video segments 504 #1-#6. As indicated by the arrow 502, the video 220 is on a repeating loop, so the video 220 restarts between video segment #6 and video segment #1. The approach 500 uses the example distances 306 of the path of movement 402 (of FIG. 4) to illustrate certain aspects. Thus, the seven time slots 302 #1-#7 are respectively associated with seven distances 306 of far, far, near, immediate, immediate, immediate, and near, like in FIG. 4.

The video 220 can be directed to an overall product. Each individual video segment 504 is directed to at least one product feature of the product. If the overall product is a smart phone, for instance, product features can include screen resolution, camera quality, processor and memory specifications, new software capabilities, size and weight, model options and costs, current pricing incentives or deals, and so forth. Each video segment 504 can be defined by or established based on time or content. If time is used, each video segment 504 can have a time period with an equal length, such as 10 seconds or one minute. One product feature may span multiple video segments 504, or multiple product features may be jointly covered during a given video segment 504. Alternatively, the lengths of the video segments 504 may be different from each other. If content is used to establish video segments 504, a length of each video segment 504 can be based on how much time is devoted to covering a given product feature. For example, one video segment 504 may last 23 seconds to cover processor and memory specifications, and another video segment 504 may last 75 seconds to cover upgraded camera capabilities and to show simulated photographic images.

In example embodiments, a distance 306 is linked to an associated video segment 504 using a time stamp 302. Hence, respective time stamps 302 establish respective linkages 506 between distances 306 and the presentation of respective video segments 504. In one approach, a time stamp 302 is affirmatively associated with a distance 306 and uploaded for analysis. The time stamp 302 can correspond to an absolute time (e.g., a time of day). Alternatively, the time stamp 302 can correspond to a time index that increases as the video 220 is played. For a time index implementation, the time stamp 302 can be represented in minutes and seconds as the video 220 elapses or as an alphanumeric code assigned to each different video segment 504. A time stamp 302 can also correspond to a time slot. In another approach, a time stamp 302 can be implicitly provided by periodically uploading distances 306 for analysis at regular intervals (e.g., as heartbeat messages every five seconds). Regardless, consumer interest indicators can be uploaded in real-time or near real-time to enable interaction with a visitor based on a pattern of movement while the visitor is still at a given venue.

Figure 6:
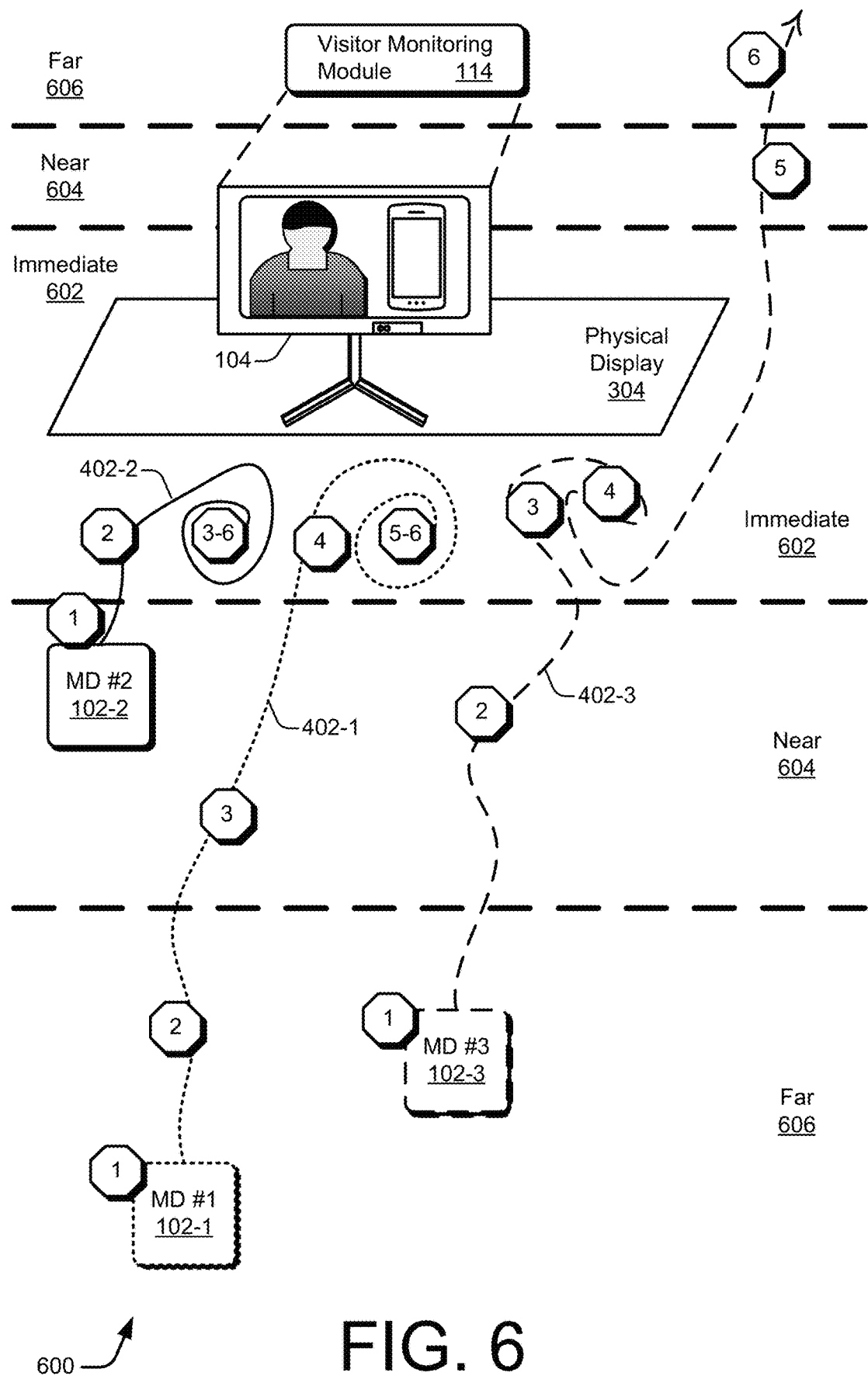
FIG. 6 illustrates example paths of movement of three mobile devices in the vicinity of the promotional apparatus across three different distance categories.

FIG. 6 illustrates, generally at 600, example paths of movement 402 of three mobile devices 102 in the vicinity of the promotional apparatus 104 across three different distance ranges. The numbers indicated in the octagonal shapes along the paths of movement 402 represent the number of the corresponding time stamp #1-#6. For this example, the three different distance ranges are separated into an immediate category 602, a near category 604, and a far category 606. The distances and paths of movement are not necessarily drawn to scale. Also, although the lines of demarcation between any two distance categories are shown as straight lines, a boundary between two different distance categories may actually be represented by circles, especially if a range to a mobile device is determined without direction and therefore corresponds to a radius.

The first mobile device 102-1 corresponding to the first path of movement 402-1 represents the same determined distances of the examples of FIGS. 4 and 5. Accordingly, it is apparent that the video engaged the attention of the visitor associated with the first mobile device 102-1. Further, the system can infer that the visitor has some level of consumer interest and that the visitor viewed the fourth, fifth, and sixth video segments, as well as possibly the third video segment due to the proximity of the first mobile device 102-1 during these video segments. For the second mobile device 102-2, the entirety of the second path of movement 402-2 is relatively close to the promotional apparatus 104. The distances measured during the second through sixth time stamps are in the immediate category 602. The system can therefore infer that the visitor associated with the second mobile device 102-2 viewed the entirety of the video and that the visitor had sufficient consumer interest to remain long enough to watch until the sixth and final video segment.

With regard to the third path of movement 402-3 for the third mobile device 102-3, the distance determined during the first time stamp is the far category 606, and the distance determined during the second time stamp is the near category 604. During the third and fourth time stamps, the distance between the third mobile device 102-3 and the promotional apparatus 104 is the immediate category 602. After pausing momentarily at these two time stamps, the third mobile device 102-3 moves further along the original trajectory and past the promotional apparatus 104. The distance determined during the fifth time stamp is the near category 604, and the distance determined during the sixth time stamp is the far category 606. From these distances and associated time stamps, it is apparent that the video caught the attention of the visitor associated with the third mobile device 102-3.

The system can infer that the visitor viewed the third and fourth video segments while at the distance of the immediate category 602 and potentially the second video segment while at the distance of the near category 604. The system can infer that the video engaged the visitor at least during the third and fourth video segments and was exposed to the corresponding product features thereof. Because the visitor moves on from the promotional apparatus 104 afterwards, a reasonable inference is that the visitor determined that the promoted product was not especially interesting after giving the video a chance. Another reasonable inference is that the visitor thought the particular product features shown during the third and fourth video segments were interesting, but the particular product features shown during the fifth video segment were less interesting. The system can also infer that the content shown during the first and sixth video segments, when the third mobile device 102-3 is at the far category 606 distance, were not seen by the associated visitor.

Determining proximity, such as distance without direction, may not be sufficient to enable an inference as to whether a visitor holding a mobile device could have actually seen a video being presented. For example, if a mobile device is actually positioned behind a display screen of a promotional apparatus 104, proximity alone may not be an adequate indication of whether an associated visitor is exposed to a video. To account for this, a display screen can be located against a wall. Also, a promotional apparatus 104 may have multiple display screens facing different directions. However, if a promotional apparatus 104 is placed where visitors can walk around or behind the display screen, a position of a mobile device can be determined (e.g., using a micro-location procedure). Multiple beacons, one of which can be co-located with the promotional apparatus 104, can be employed to determine a position of the mobile device, such as by conducting a trilateration procedure. The position can be used to ascertain whether or not a visitor associated with the mobile device has a direct line of sight to the front of the display screen.

Alternatively, a camera, which can be part of the promotional apparatus 104, is used to detect faces to corroborate or further support a likelihood that a visitor is viewing a video. If a face of a visitor is detectable, the system can determine if the visitor is looking at, or at least facing, the display screen while the video is being presented. A "looking at" tag as an additional consumer interest indicator 128 (e.g., of FIGS. 1 and 7) may be appended to proximity information provided from the promotional apparatus 104 or a mobile device 102 to facilitate more accurate or more complete analysis of the consumer interest indicators 128. In another example implementation, the system may display additional information about the product on the user's mobile device and enable the user to explore the product further. Whether the user dismisses this opportunity or explores for further information can serve as another indication of user interest and be reported and analyzed accordingly.

Figure 7:
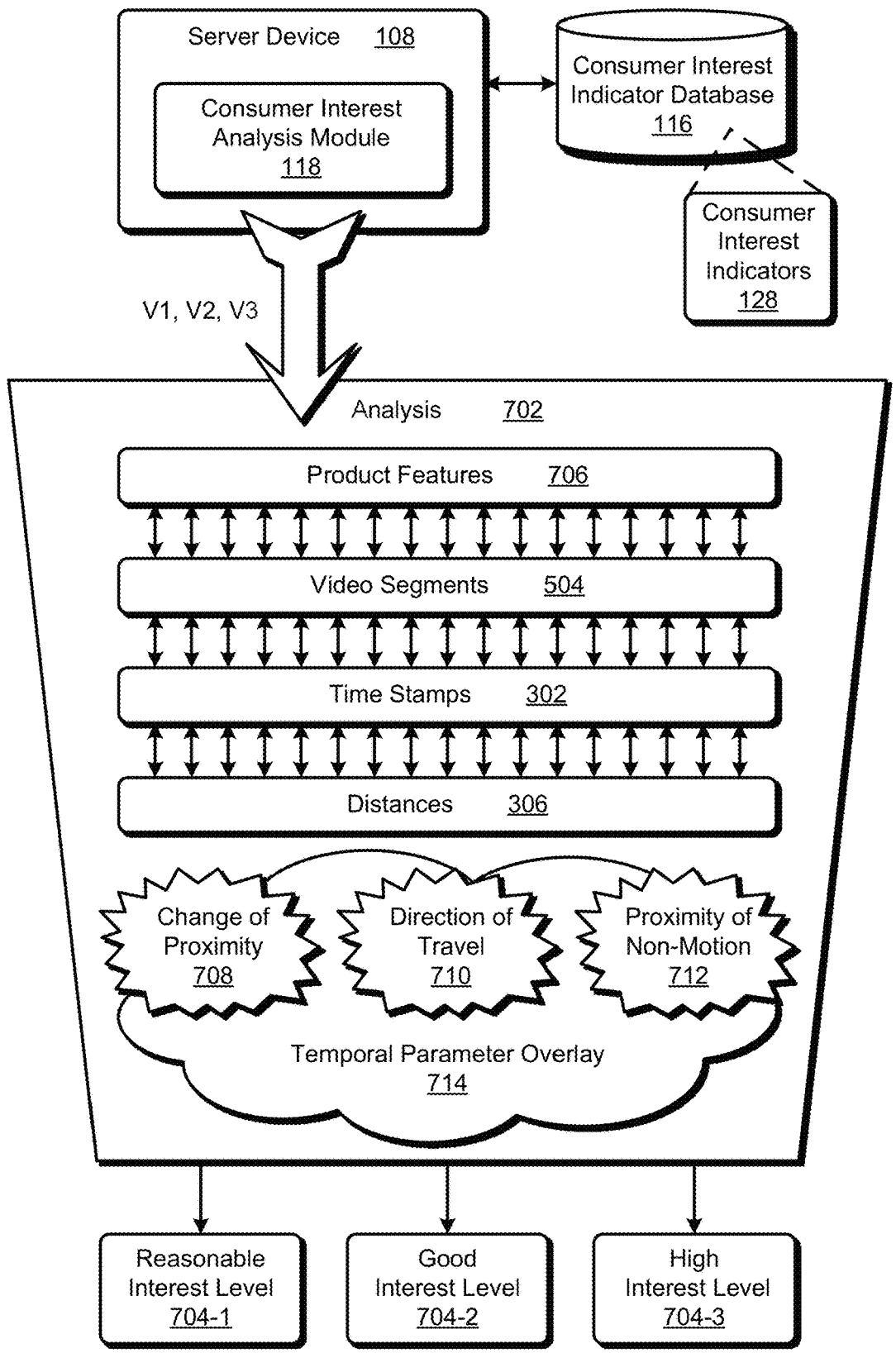
FIG. 7 illustrates an example approach to analyzing consumer interest indicators in accordance with at least one factor to infer an interest level.

FIG. 7 illustrates an example approach 700 for analyzing consumer interest indicators 128 in accordance with at least one factor to infer an interest level 704. The approach 700 is described in part with reference to an example set of consumer interest indicators 128 that are collected and stored by the consumer interest indicator database 116. This example set of consumer interest indicators for three visitors V1, V2, and V3 is provided below in Table 1.

TABLE 1

Example of multiple consumer interest indicators or a portion of a consumer interest indicator database.

| Visitor Identifier | Proximity at Video Start | Proximity at Video Start + T | Proximity at Video Start + 2T | Proximity at Video Start + 3T | | Proximity at Video End − T | Proximity at Video End |
|---|---|---|---|---|---|---|---|
| V1 | Near | Immediate | Immediate | Immediate | ... | Immediate | Immediate |
| V2 | Far | Far | Near | Immediate | ... | Immediate | Immediate |
| V3 | Far | Near | Immediate | Immediate | ... | Far | Far |
| ... | ... | ... | ... | ... | | ... | ... |

In this example scenario, the mobile device of each visitor V1, V2, and V3 determines a distance 306 to a beacon of a promotional apparatus or reports a distance 306 each T time period in accordance with a heartbeat scheme. Proximities are provided at the start of the video, at +T after the start of the video, at +2T, at +3T, ... , at −T from the end of the video, and at the end of the video. Each of the three visitors, via an associated mobile device, reports a proximity using a categorical distance of near, immediate, or far as shown in Table 1 above. The proximities of visitor V2 in Table 1 are the same as those given for the mobile device 102 in FIGS. 4-5 and the first mobile device 102-1 in FIG. 6.

At each heartbeat occurrence, or for each time period T, a mobile device transmits to the server device 108 a beacon identifier, a visitor identifier, and a most-recently-determined proximity Using such raw information received from one or more mobile devices, the server device 108 can build a data structure like that of Table 1 for further analysis.

The consumer interest analysis module 118 applies an analysis 702 to the consumer interest indicators 128. As shown, multiple distances 306 are respectively associated with multiple time stamps 302, and the multiple time stamps 302 are respectively associated with multiple video segments 504 to thereby respectively link the multiple distances 306 to the multiple video segments 504. Each respective video segment 504 corresponds to at least one product feature 706 of a product being promoted by a video.

At least one factor of a multitude of potential factors may be incorporated into the analysis 702. These factors may be extracted from consumer interest indicators 128, a path of movement 402, a temporal parameter overlay 714 that provides an order of occurrence for proximities or linkages 506 (e.g., of FIG. 5), a combination thereof, and so forth. For example, a change of proximity factor 708 may be incorporated by considering if a visitor moves from an immediate distance to a far distance, or vice versa. Also, a direction of travel factor 710 may be incorporated by considering if a visitor deviates from a direction of movement so as to move closer to a display screen of a playing video. A proximity of non-motion 712 can be incorporated by considering how close a visitor is to a playing video if the visitor ceases movement for some amount of time. Using the temporal parameter overlay 714, durations of non-motion at determined proximities can be incorporated into the analysis 702.

Other factors may be incorporated in addition to proximity. For example, whether a "looking at" tag has been appended to a proximity can be considered. Also, a location of the promotional apparatus can be incorporated into an analysis. If a promotional apparatus is located near a checkout counter or near elevators, lower priority can be assigned to such proximity because a visitor may be stopped in those areas for other reasons besides watching the video. Further, a visitor may interact with a promotional apparatus, such as by requesting with voice or touch to see available colors or a more in-depth demonstration of the product. If so, the analysis can assign a higher priority to corresponding proximity data for an associated visitor. Although the analysis 702 is described as being performed by a consumer interest analysis module 118 of a server device 108, at least some analysis of the consumer interest indicators 128 may alternatively be performed by a promotional apparatus 104.

Based on the analysis 702, the consumer interest analysis module 118 infers an interest level 704 for an individual visitor or a group of visitors. The interest level 704 can pertain to an entire video and corresponding product or to specific video segments and corresponding product features. Example interest levels 704 in decreasing order of interest are: a high interest level 704-3, a good interest level 704-2, and a reasonable interest level 704-1. Examples of interest levels 704 for other implementations include use of values for low, medium, and high interest. Alternatively, interest levels 704 may be implemented as a numerical range, such as being assigned values between zero and one in which values near zero indicate little interest and values nearer to one indicate increasingly higher interest.

An example of a visitor that is inferred to have a high interest level 704-3 is as follows. Initially, the visitor is moving (e.g., is continuously receiving a far or an unknown signal from a beacon attached to digital signage) and then reaches a viewable range of a promotional apparatus (e.g., starts to receive an immediate or a near signal from the beacon attached to the signage). The visitor stops and watches an entirety of a video (e.g., continues to receive an immediate or a near signal from the beacon attached to the signage until the video completes). A visitor with a high level of interest also watches the video loopback (e.g., continues to receive an immediate or a near signal during the video loopback) until the visitor has a chance to view each video segment of the video, including those that were missed before the initial approach to the promotional apparatus. Hence, this visitor has an associated visitor identifier entry in two or more consecutive tables for the promotional video being presented.

An example of a visitor that is inferred to have a good interest level 704-2 is as follows. Initially, the visitor is moving (e.g., is continuously receiving a far or an unknown signal from a beacon attached to digital signage) and then reaches a viewable range of a promotional apparatus (e.g., starts to receive an immediate or a near signal from the beacon attached to the signage). The visitor stops and watches an entirety of a video (e.g., continues to receive an immediate or a near signal from the beacon attached to the signage until the video completes). A visitor with a good level of interest then moves away from the promotional apparatus (e.g., again starts receiving a far or an unknown signal from the beacon attached to the signage) without waiting to see any video segments that were missed prior to the initial approach to the promotional apparatus.

An example of a visitor that is inferred to have a reasonable interest level 704-3 is as follows. Initially, the visitor is moving (e.g., is continuously receiving a far or an unknown signal from a beacon attached to digital signage) and then reaches a viewable range of a promotional apparatus (e.g., starts to receive an immediate or a near signal from the beacon attached to the signage). The visitor stops and watches one or more portions of a video (e.g., continues to receive an immediate or a near signal from the beacon attached to the signage for those portions of the video). The visitor then moves away from the promotional apparatus (e.g., again starts receiving a far or an unknown signal from the beacon attached to the signage) before the video completes.

The analysis 702 can reveal additional inferences. For example, based on the time stamps 302 for which a visitor is within a viewable range of (e.g., at an immediate or a near distance to) a promotional apparatus 104 when a product video is playing, the following two items may be inferred. Firstly, particular product features that may interest a given visitor can be inferred based on the video segments that are running while the visitor remains in viewable range of the playing video. Also, if the visitor moves to an immediate distance for certain video segments, then the level of interest may be higher for the corresponding product features shown during those video segments. Secondly, the existence of product features that are more likely to be unknown to a visitor may be inferred based on missed video segments. For instance, if a visitor arrives at the one minute mark for a three minute video and stays for the remaining duration of the video, the system can infer that the visitor is interested in the promoted product but potentially missed the product features showcased during the video segments of the first minute.

Based on the analysis 702, several actionable inferences can be drawn and then provided to a marketer, to a venue operator 126, or to a seller of a promoted product or can be used directly by the service provider 124 (e.g., of FIG. 1). Because the analysis may be applied across multiple visitors using multiple visitor identifiers 202 (e.g., of FIG. 2), the system can infer which visitors are likely to be interested in a promoted product. Based on the number of visitors that are interested currently versus those that are interested historically, a marketer can compare consumer interest data for different products over time to determine a number of things. Firstly, the marketer can determine which promotional videos are engaging visitors for which products. Secondly, if visitor engagement in a promotional video has decreased over time to some level that is too low, the marketer can determine that the promotional video should be updated or replaced.

Further, for each visitor the system can infer if a given visitor is a high value prospect (e.g., the visitor watched the product video multiple times), a good value prospect (e.g., the visitor watched the video until the end), or a reasonable value prospect (e.g., the visitor watched some portion of the video and then left before the end). For good and reasonable value prospects, a marketer can enable the visitor to learn more about product features that were potentially missed. For instance, the marketer can send a Web link or setup an option in an application to enable the visitor to easily view the missed video segments, view the entirety of the promotional video, read about the specific product features that were missed, and so forth. Additionally, if an in-person visitor is about to reach a display screen of a promotional apparatus and there are no other visitors nearby, the system can cause the promotional apparatus to play those video segments that engage visitors generally, those video segments that have engaged this particular in-person visitor in the past, those video segments that this particular in-person visitor missed previously, and so forth. The system can also analyze the videos or the video segments that the visitor has viewed across multiple visits to the venue, or in different parts of the venue during the same visit. The system can further correlate these viewings with purchases and online behavior, such as product browsing using the mobile application 110, to better understand the interests of that visitor.

For general marketing purposes, the system can also infer which product features are generally attracting the attention of in-person visitors and which product features are generally failing to attract the attention of in-person visitors. The former can be identified based on those product features that are being shown when visitors who are moving across a promotional apparatus typically cease moving and start watching the video. The latter can be identified as those product features that are being shown when visitors who are watching the video start to move away from the promotional apparatus. These inferences can guide a marketer to reimagine the content for a modified or future video promoting the same or a similar product. Such inferences can also be used to inform in-store attendants of what product features should be pitched to in-store visitors. Generally, analyzing consumer interest indicators to determine which product features attract the most attention from in-person visitors can be used to rank the product features in terms of relative consumer interest. A marketer can use this ranking of product features to ascertain which product features should be the focus or emphasis for advertising other goods or services in the same product category.

Demographic data for in-person visitors can also be obtained, separately or via the application 110. Examples of demographic data include age, gender, income, marital status, the presence and ages of kids in the home, profession, hobbies, and so forth. If demographic data is available for each visitor identifier 202, the system can filter or organize consumer interest indicators, inferred consumer interest, inferred product feature preferences, and so forth by different demographically-based characteristics. For example, a system that gauges consumer interest can ascertain which demographic group (e.g., as identified by age, gender, etc.) shows relatively more consumer interest in a given product as compared to other demographic groups. The system can also ascertain which particular product features different demographic groups are more or most interested in. For instance, a washing machine promotional video likely attracts middle-aged in-person visitors more than twenty-somethings or teenagers. But a mobile phone promotional video may be appealing across many age groups.

Having discussed example details of systems, techniques, and schemes for gauging consumer interest of in-person visitors, consider now some example procedures to illustrate additional aspects of the techniques.

Example Procedures

Figure 8:
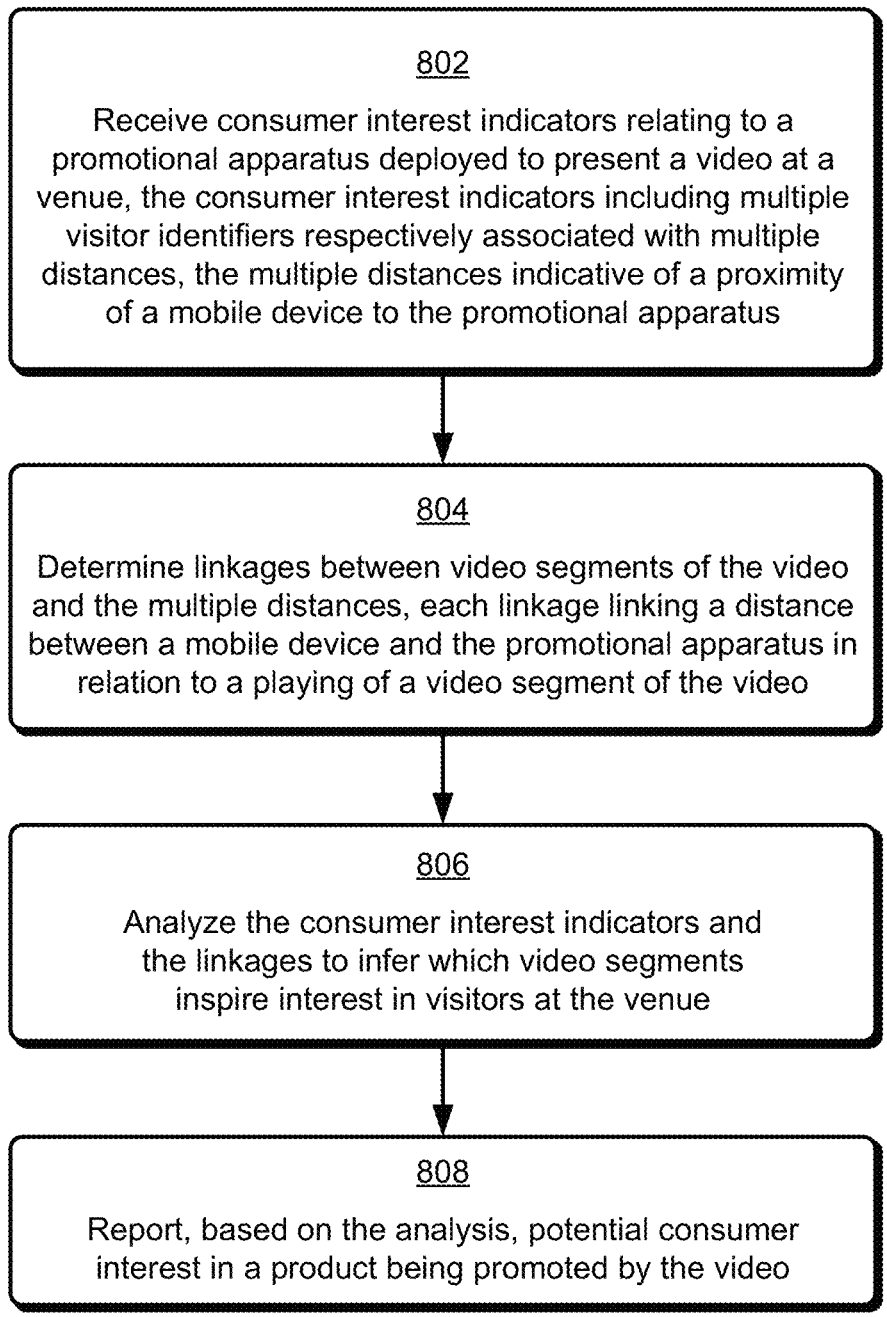
FIG. 8 is a flow diagram illustrating an example procedure in accordance with one or more example embodiments.
Figure 9:
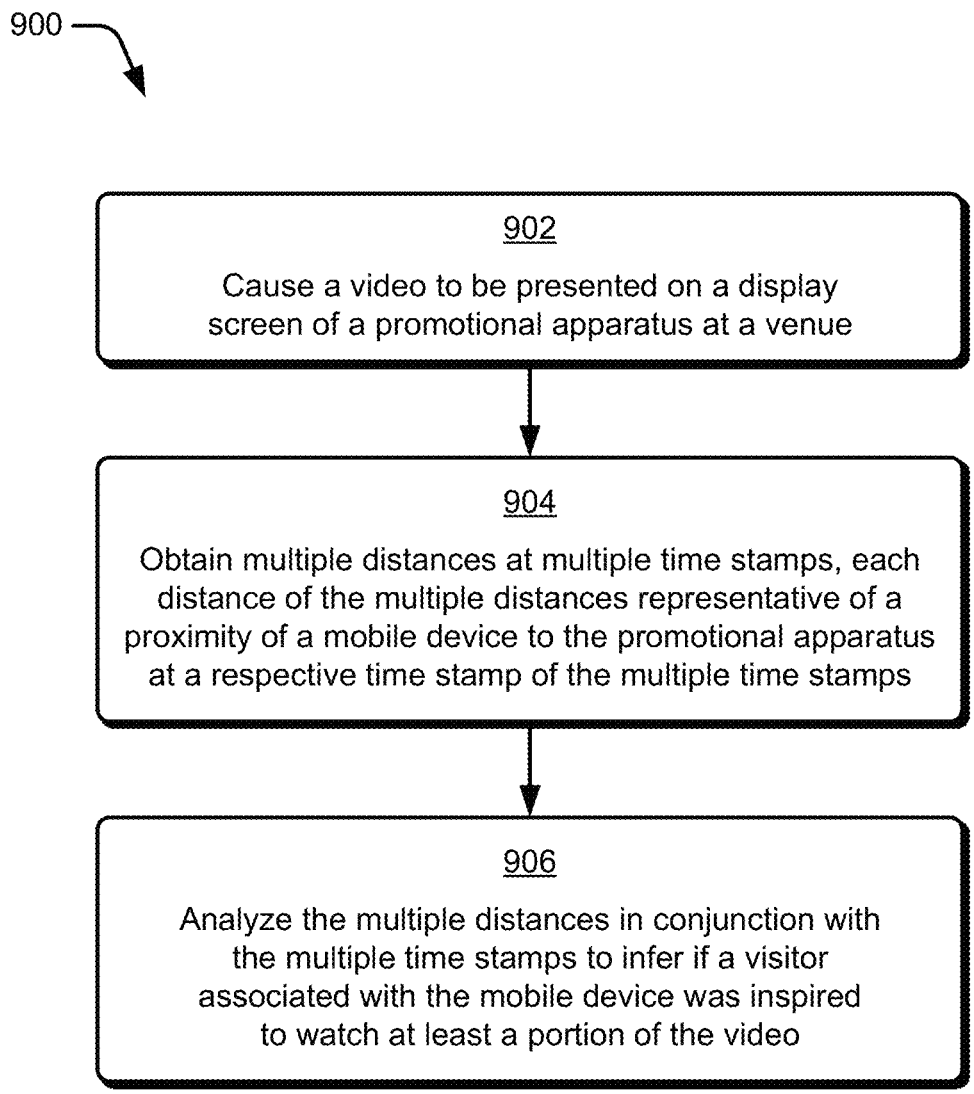
FIG. 9 is another flow diagram illustrating another example procedure in accordance with one or more example embodiments.

This section describes with reference to FIGS. 8 and 9 example procedures relating to gauging consumer interest of in-person visitors in one or more embodiments. The procedures of FIGS. 8 and 9 are depicted with flow diagrams. Aspects of the procedures may be implemented in hardware, firmware, or software, or a combination thereof. The procedures are shown as sets of blocks that specify operations that may be performed by one or more devices, but performance of the operations is not necessarily limited to the orders as shown by the respective blocks or as described herein, for the operations may be performed in other orders or in fully or partially overlapping manners. In at least some embodiments, the procedures may be performed by at least one suitably configured device, such as a server device 108 that makes use of an example consumer interest analysis module 118 or a promotional apparatus 104 that makes use of an example visitor monitoring module 114 (e.g., both of FIG. 1).

FIG. 8 is a flow diagram 800 that includes four blocks 802-808 and that illustrates an example procedure for gauging consumer interest of in-person visitors in accordance with one or more example embodiments. At block 802, consumer interest indicators are received that relate to a promotional apparatus that is deployed to present a video at a venue, with the consumer interest indicators including multiple visitor identifiers respectively associated with multiple distances and the multiple distances indicative of a proximity of a mobile device to the promotional apparatus. For example, a server device 108 may receive consumer interest indicators 128 from a mobile device 102, from a promotional apparatus 104, some combination thereof, and so forth. The promotional apparatus 104 is deployed to present a video 220 at a venue 120, and the consumer interest indicators 128 include multiple visitor identifiers 202 respectively associated with multiple distances 306. The multiple distances 306 are indicative of a proximity of a mobile device 102 to the promotional apparatus 104. The server device 108 can receive, for instance, raw consumer interest indicators 128 or partially processed consumer interest indicators 128 that were collected by one or more mobile devices 102 or by the promotional apparatus 104 from one or more different mobile devices 102 during one presentation of the video 220 or over multiple presentations of the video 220. The consumer interest indicators 128 can be received in real-time or in batches.

At block 804, linkages are determined between video segments of the video and the multiple distances, with each linkage linking a distance between a mobile device and the promotional apparatus in relation to a playing of a video segment of the video. For example, the server device 108 may determine linkages 506 between video segments 504 of the video 220 and the multiple distances 306. Each linkage 506 links a distance 306 between a mobile device 102 and the promotional apparatus 104 in relation to a playing of a video segment 504 of the video 220. To do so, the server device 108 can use time stamps 302 that are respectively associated with the multiple distances 306 and knowledge of the times at which particular video segments are played by the promotional apparatus 104 to link mobile device proximities with the particular video segments that are playing when the proximities are determined.

At block 806, the consumer interest indicators and the linkages are analyzed to infer which video segments inspire interest in visitors at the venue. For example, the server device 108 may analyze the consumer interest indicators 128 and the linkages 506 to infer which video segments 504 inspire interest in visitors 122 at the venue 120. A consumer interest analysis module 118 may, for instance, use a temporal parameter overlay 714 to detect factors revealing an in-person visitor's interest in one or more video segments 504. Factors can include a change of proximity 708, a direction of travel 710, or a proximity of non-motion 712.

At block 808, based on the analysis, potential consumer interest in a product being promoted by the video is reported. For example, the server device 108 may report potential consumer interest in a product being promoted by the video 120 based on at least one result of the analysis 702 of the consumer interest indicators 128. To effectuate the reporting, the consumer interest analysis module 118 can signal an interest level 704 of a particular visitor 122 with regard to a corresponding product or can transmit a communication that identifies one or more video segments 504 of the video 220 that engages a certain percentage of in-person visitors 122 that are exposed to the video 220.

FIG. 9 is a flow diagram 900 that includes three blocks 902-906 and that illustrates an example procedure for gauging consumer interest of in-person visitors in accordance with one or more example embodiments. At block 902, a video is caused to be presented on a display screen of a promotional apparatus at a venue. For example, a promotional apparatus 104 may cause a video 220 to be presented on a display screen 206 of the promotional apparatus 104 at a venue 120. Alternatively, a server device 108 may instruct a promotional apparatus 104 to play a video 220 on a display screen 206 at an announced time.

At block 904, multiple distances at multiple time stamps are obtained, with each distance of the multiple distances representative of a proximity of a mobile device to the promotional apparatus at a respective time stamp of the multiple time stamps. For example, the promotional apparatus 104 may obtain multiple distances 306 at multiple time stamps 302. Each distance 306 of the multiple distances 306 is representative of a proximity of a mobile device 102 to the promotional apparatus 104 at a respective time stamp 302 of the multiple time stamps 302. To do so, a beacon 208 of the promotional apparatus 104 can communicate with the mobile device 102 to determine respective distances 306 at respective time slots. Alternatively, the server device 108 can receive from the mobile device 102 respective distances 306 associated with respective time stamps 302.

At block 906, the multiple distances are analyzed in conjunction with the multiple time stamps to infer if a visitor associated with the mobile device was inspired to watch at least a portion of the video. For example, the promotional apparatus 104 may analyze the multiple distances 306 in conjunction with the multiple time stamps 302 to infer if a visitor 122 associated with the mobile device 102 was inspired to watch at least a portion of the video 220. The promotional apparatus 104 or the server device 108 may, for instance, infer based on timings of proximities to (e.g., times of occurrence or durations of occurrence for distances within a viewable range of) a playing video 220 that the visitor 122 carrying the mobile device 102 was motivated to take time to watch at least a portion of the video 220.

Having described example procedures in accordance with one or more embodiments, consider now an example system and device that can be utilized to implement the various schemes and techniques described herein.

Example System and Device

Figure 10:
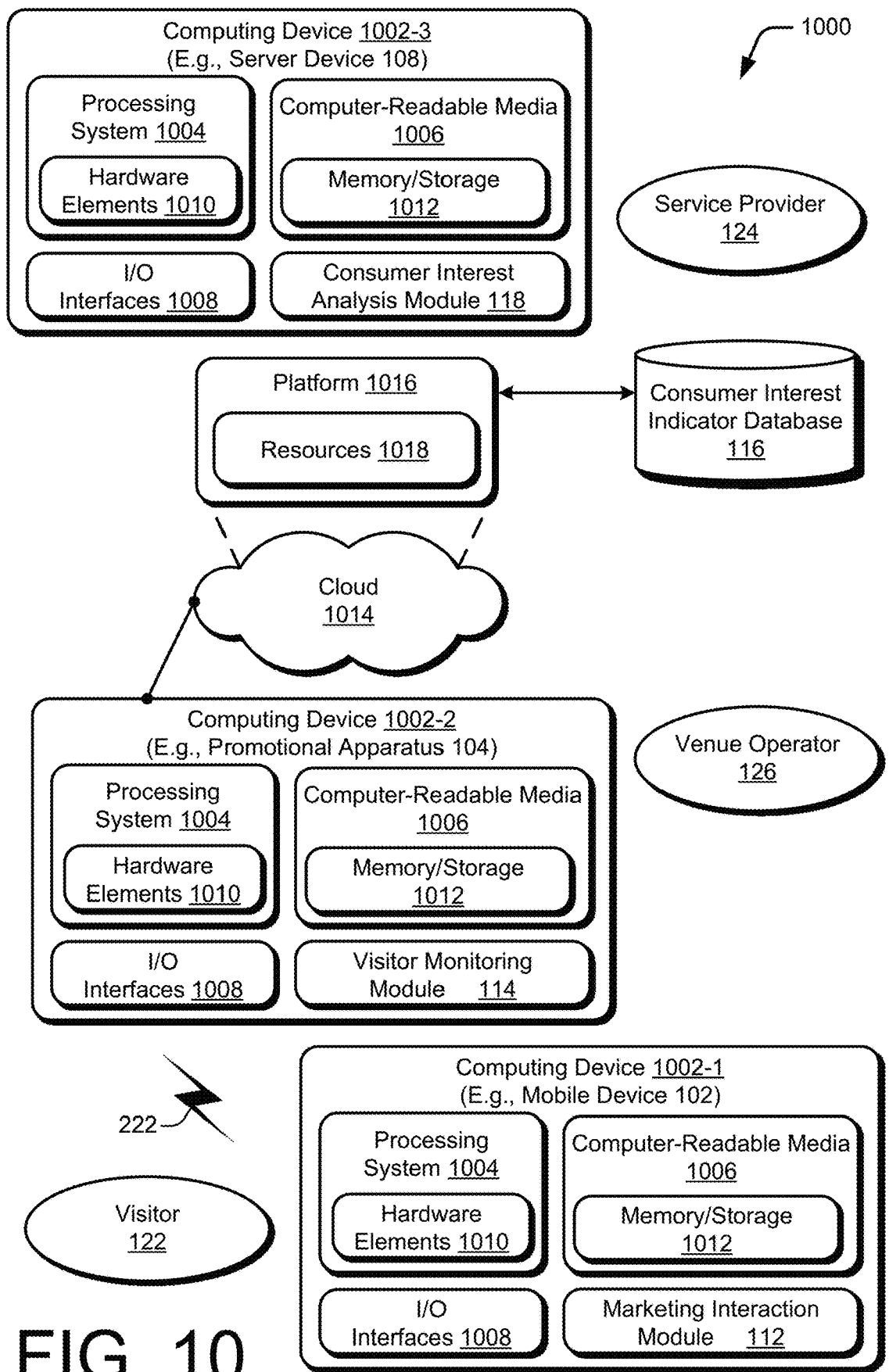
FIG. 10 illustrates an example system including various components of example devices that can be employed for one or more embodiments of gauging consumer interest of in-person visitors.

FIG. 10 illustrates an example system 1000 including example computing devices 1002 that are representative of one or more computing systems or computing devices that may implement the various techniques described herein. This is illustrated through the inclusion of multiple modules for a consumer interest gauging system, which may operate as described herein above, as well as a consumer interest indicator database 116. The computing modules include a marketing interaction module 112, a visitor monitoring module 114, and a consumer interest analysis module 118. A computing device 1002 may comprise, for example, an end-user device (e.g., a mobile device) of a visitor 122, a physical device at a venue (e.g., a promotional apparatus) of a venue operator 126, a server device of a service provider 124, an on-chip system or system-on-a-chip (SOC), or any other suitable computing device or computing system. An example mobile device 102 is represented by the computing device 1002-1, an example promotional apparatus 104 is represented by the computing device 1002-2, and an example server device 108 is represented by the computing device 1002-3.

The example computing devices 1002 as illustrated include at least one processing system 1004, one or more computer-readable media 1006, and one or more I/O interfaces 1008 that may be communicatively coupled, one to another. Although not explicitly shown, each computing device 1002 may further include a system bus or other data and command transfer system that couples the various components, one to another. A system bus can include any one or combination of different bus structures, such as a memory bus or memory controller, a peripheral bus, a universal serial bus, or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that may be configured as processors, functional blocks, and so forth. This may include implementation in hardware as an application specific integrated circuit (ASIC) or other logic device formed using e.g. one or more semiconductors. The hardware elements 1010 are not limited by the materials from which they are formed or the processing mechanisms employed therein. For example, processors may be comprised of semiconductor(s) or transistors (e.g., electronic integrated circuits (ICs)). In such a context, processor-executable instructions may comprise electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) or nonvolatile media (such as read only memory (ROM), flash memory, optical discs, or magnetic disks). The memory/storage component 1012 may include fixed media (e.g., RAM, ROM, or a fixed hard drive formed from electromagnetic disks or flash memory) or removable media (e.g., flash memory, a removable hard drive, or an optical disc). The computer-readable media 1006 may be configured in a variety of other ways as further described below.

Input/output interface(s) 1008 are representative of functionality to allow a user to enter commands or information to computing device 1002 or to allow information to be presented to the user, or other components or devices using various input/output devices. Examples of input devices include a keyboard, a cursor control device (e.g., a mouse or touchpad), a microphone, a scanner, touch functionality (e.g., capacitive, resistive, or other sensors that are configured to detect physical touch), a camera (e.g., which may employ visible or non-visible wavelengths such as infrared frequencies to recognize movement as gestures that need not involve touch), or a combination thereof. Examples of output devices include a display device (e.g., an LCD or LED screen, a monitor, or a projector), a speaker, a printer, a network card, a haptic vibrating device, or a combination thereof. Thus, the computing device 1002 may be configured in a variety of ways as further described below to support local or remote user interaction.

An embodiment of the described modules, and techniques thereof, may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media," as used herein, refers to media or devices that enable persistent and/or non-transitory storage of information in contrast to mere signal transmission, carrier waves, or signals per se. Computer-readable storage media does not include signals per se or signal bearing media. The computer-readable storage media includes hardware such as volatile and non-volatile, removable and non-removable media or storage devices implemented in a process or technology suitable for storage of information, such as computer readable instructions, data structures, program modules, logic elements/circuits, or other data. Examples of computer-readable storage media include RAM, ROM, EEPROM, flash memory, or other e.g. solid state memory technology; CD-ROM, digital versatile discs (DVD), or other optical storage; hard disks, magnetic cassettes, magnetic tape, magnetic disk storage, or other magnetic storage devices; or other storage device, tangible media, article of manufacture, or combination thereof that is suitable to store desired information and that may be accessed by a computer.

"Computer-readable signal media," as used herein, refers to a signal-bearing medium that is configured to transmit instructions to hardware of the computing device 1002, such as via a network. Computer-readable signal media typically may embody computer readable instructions, data structures, program modules, or other data in a modulated data signal, such as carrier waves, data signals, or other transport mechanism. Computer-readable signal media may also include any information delivery media. The term "modulated data signal" means a signal that has one or more of its characteristics set or changed in such a manner as to encode information in the signal. By way of example, computer-readable signal media may include wired media, such as a wired network or direct-wired connection, and wireless media such as acoustic, RF, microwave, infrared, or other wireless media.

As previously described, the hardware elements 1010 and the computer-readable media 1006 may be representative of modules, programmable device logic, fixed device logic, a combination thereof, and so forth that is implemented in a hardware form that may be employed in some embodiments to implement at least some aspects of the techniques described herein, such as to perform one or more instructions or computing actions. Hardware may include components of an integrated circuit (IC) or on-chip system, an application-specific integrated circuit (ASIC), a field-programmable gate array (FPGA), a complex programmable logic device (CPLD), or other implementations in silicon or other hardware. In this context, hardware may operate as a processing device that performs program tasks defined by instructions or logic embodied by the hardware as well as hardware utilized to store instructions for execution, e.g., the computer-readable storage media described previously.

Combinations of the foregoing may also be employed to implement various techniques described herein. Accordingly, software, hardware, or executable modules may be implemented as one or more instructions or logic embodied on some form of computer-readable storage media or by one or more of the hardware elements 1010. The computing device 1002 may be configured to implement particular instructions or functions corresponding to software or hardware modules. Accordingly, implementation of a module that is executable by the computing device 1002 as software may be achieved at least partially in hardware, e.g., through use of computer-readable storage media or the hardware elements 1010 of the processing system 1004. The instructions or functions may be executable/operable by one or more articles of manufacture (e.g., one or more of the computing devices 1002 or the processing systems 1004) to implement techniques, modules, or examples described herein.

The techniques described herein may be supported by various configurations of the computing device 1002 and are not limited to the specific aspects of the example devices described herein. This functionality may also be implemented fully or partially through use of a distributed system, such as over a "cloud" 1014 via a platform 1016 as described below.

The cloud 1014 may include or represent a platform 1016 for resources 1018. The platform 1016 abstracts underlying functionality of hardware (e.g., servers or data centers) and software resources of the cloud 1014. The resources 1018 may include applications or data that can be utilized while computer processing is at least partially executed on servers that are remote from, or distributed around, the computing device 1002. Resources 1018 may also include services provided over the Internet or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000, or at least throughout the cloud 1014 along with a computing device 1002, such as the computing device 1002-2 or 1002-3. For example, functionality may be implemented in part on a computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computing device operative in a digital medium environment in which in-person visitor behavior is monitored, the computing device comprising:
   a processing system; and
   a computer-readable storage medium having instructions stored thereon that, responsive to execution by the processing system, causes the processing system to perform operations including:
      receiving consumer interest indicators relating to an apparatus deployed to present a video at a venue, the consumer interest indicators including multiple visitor identifiers respectively associated with multiple distances, each distance of the multiple distances indicative of a proximity of a mobile device to the apparatus;
      determining linkages between video segments of the video presented sequentially at the venue over time and the multiple distances, each linkage linking a distance of the multiple distances between the mobile device and the apparatus in relation to a playing of a respective said video segment of the video;
      determining visitor interest in at least one product feature from different product features of a product based on the determined linkages indicating which video segment of the video segments inspire visitor interest at the venue, the video segments corresponding to the different product features of the product, respectively; and
      reporting the determined visitor interest in the at least one product feature of the product corresponding to a video segment of the video segments and at least one additional product feature corresponding to another video segment of the video segments that was missed by a visitor.

2. The computing device as described in claim 1, wherein the determining of the linkages comprises using multiple time stamps that are respectively associated with the multiple distances to link each distance of the multiple distances to a video segment that the apparatus was playing when the linked distance was determined.

3. The computing device as described in claim 1, wherein the reporting comprises communicating the visitor interest in the at least one product feature as gauged by an apparent willingness of visitors to watch at least one of the video segments of the video.

4. The computing device as described in claim 1, wherein determining the visitor interest in the at least one product feature of the different product features comprises analyzing the consumer interest indicators and the linkages over time based on particular distances of the multiple distances that are jointly associated with a particular visitor identifier of the multiple visitor identifiers, the particular distances are representative of a path of movement of the mobile device associated with the particular visitor identifier.

5. The computing device as described in claim 1, wherein determining the visitor interest in the at least one product feature of the different product features comprises detecting engagement by visitors with the video based on mobile devices of the visitors at least slowing in movement within a proximity of the apparatus.

6. The computing device as described in claim 1, wherein determining the visitor interest in the at least one product feature of the different product features comprises incorporating a direction of travel factor and a proximity of non-motion factor.

7. In a digital medium environment, a method implemented by at least one computing device, the method comprising:
    causing, by the at least one computing device, a video having video segments to be presented on a display screen of an apparatus at a venue sequentially over time, the video segments corresponding to different product features of a product, respectively;
    obtaining, by the at least one computing device, data describing multiple distances at multiple time stamps, each distance of the multiple distances representative of a proximity of a mobile device to the apparatus at a respective time stamp of the multiple time stamps;
    linking, by the at least one computing device, the multiple time stamps and the multiple distances with respective video segments of the video segments;
    analyzing, by the at least one computing device, visitor interest based on the linking, the analyzing includes determining visitor interest in a particular product feature from the different product features of the product based on a distance that is respectively linked to a video segment corresponding to the particular product feature; and
    outputting in a user interface, by the at least one computing device, a result of the determined visitor interest in the particular product feature of the product and at least one additional product feature that was missed by a visitor.

8. The method as described in claim 7, further comprising categorizing an interest level of the visitor based on a path of movement of the mobile device within the venue, the path of movement representative of directions of travel and positional proximities of the mobile device with respect to the apparatus.

9. The method as described in claim 7, wherein:
    the obtaining comprises obtaining the multiple distances at the multiple time stamps for multiple in-person visitors; and
    the analyzing includes determining an interest level in the video across the multiple in-person visitors.

10. A mobile device operative in a digital medium environment, the mobile device comprising:
    a beacon detection module implemented using a processing system and computer-readable storage medium to detect a beacon that is in wireless range, the beacon associated with an apparatus that is:
        adapted to present video segments of a video sequentially over time on a display screen of the apparatus, the video segments corresponding to different product features of a product, respectively; and
        configured to broadcast an apparatus identification;
    a proximity determination module configured to determine a distance to the beacon; and
    a reporting module configured to:
        associate the apparatus identification and the distance with a visitor identifier and a time stamp, and
        report visitor interest in at least one product feature of the product corresponding to a video segment of the video segments and at least one additional product feature corresponding to another video segment of the video segments that was missed by a visitor.

11. The mobile device as described in claim 10, wherein the distance comprises a distance range.

12. The mobile device as described in claim 11, wherein the distance range comprises a distance category of multiple distance categories.

13. The mobile device as described in claim 10, wherein the apparatus identification comprises a beacon identifier.

14. The mobile device as described in claim 10, wherein:
    the proximity determination module is further configured to determine the distance to the beacon with regard to a time stamp; and
    the reporting module is further configured to report the distance in association with the time stamp.

15. The mobile device as described in claim 10, wherein:
    the proximity determination module is further configured to determine the distance to the beacon at intervals; and
    the reporting module is further configured to report the distance at the intervals in accordance with a heartbeat scheme.

16. The mobile device as described in claim 10, wherein:
    the proximity determination module is further configured to determine a position of the mobile device at least with respect to the beacon; and
    the reporting module is further configured to report the position in association with the visitor identifier and the apparatus identification.

17. The method as described in claim 7, wherein the outputting further comprises displaying notice of at least one product feature that was missed on the video by a particular visitor.

18. The method as described in claim 7, wherein the analyzing further comprises incorporating a proximity of non-motion factor.

19. The method as described in claim 7, wherein each distance of the multiple distances is associated with a respective distance range.

20. The computing device as described in claim 1, wherein each distance of the multiple distances is associated with a respective distance range.

* * * * *